US008456045B2

(12) United States Patent
Hayashi et al.

(10) Patent No.: US 8,456,045 B2
(45) Date of Patent: Jun. 4, 2013

(54) HEAT-GENERATING PORTION COOLING STRUCTURE OF VEHICLE DRIVE APPARATUS

(75) Inventors: Koji Hayashi, Aichi-gun (JP); Makoto Tomita, Nagoya (JP); Shinichi Kojima, Toyota (JP); Ryuichi Hasegawa, Toyota (JP); Takahiro Miki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/057,875

(22) PCT Filed: Mar. 31, 2010

(86) PCT No.: PCT/JP2010/002368
§ 371 (c)(1),
(2), (4) Date: Feb. 7, 2011

(87) PCT Pub. No.: WO2010/116689
PCT Pub. Date: Oct. 14, 2010

(65) Prior Publication Data
US 2012/0091836 A1    Apr. 19, 2012

(30) Foreign Application Priority Data

Apr. 8, 2009 (JP) ................................. 2009-093503

(51) Int. Cl.
*H02K 9/00* (2006.01)
(52) U.S. Cl.
USPC ................................. 310/57; 310/54; 310/113
(58) Field of Classification Search
USPC .................... 310/112–114, 52, 54, 57–59, 64
See application file for complete search history.

(56) References Cited

U.S. PATENT DOCUMENTS 2,414,532 A * 1/1947 Johns et al. ..................... 310/57
2,610,992 A * 9/1952 Johns et al. ..................... 310/57
(Continued)

FOREIGN PATENT DOCUMENTS

FR    2 751 726 A1    1/1998
JP    A-07-217725      8/1995
(Continued)

OTHER PUBLICATIONS

International Search Report issued in PCT/JP2010/002368, mailed Jul. 6, 2010. (with English-language translation).

(Continued)

*Primary Examiner* — Dang Le
(74) *Attorney, Agent, or Firm* — Oliff & Berridge, PLC

(57) ABSTRACT

A heat-generating portion cooling structure of vehicle drive apparatus that sufficiently supplies cooling oil to heat-generating portions to enhance efficiency of the vehicle drive apparatus when the heat-generating portions generate maximum heat includes drawing means for drawing oil in a case into a catch tank, and an oil circulation passage for circulating the oil through the catch tank while supplying the oil to first and second heat-generating portions. The oil circulation passage includes a first passage for the oil to flow to the first heat-generating portion when the oil surface in the catch tank is at a first height and a second passage for the oil to flow to the second heat-generating portion when the oil surface is at a second height lower than the first height, and more amount of oil flows to the second heat-generating portion than to the first heat-generating portion when the oil surface is low.

10 Claims, 13 Drawing Sheets

U.S. PATENT DOCUMENTS

| | | | | |
|---|---|---|---|---|
| 4,965,477 | A | * | 10/1990 | Stadler et al. .................. 310/114 |
| 7,402,923 | B2 | * | 7/2008 | Klemen et al. ................... 310/54 |
| 7,893,581 | B2 | * | 2/2011 | Miura et al. ...................... 310/71 |
| 2012/0091835 | A1 | * | 4/2012 | Kim et al. ........................ 310/54 |

FOREIGN PATENT DOCUMENTS

| | | |
|---|---|---|
| JP | A 2001-238406 | 8/2001 |
| JP | A-2005-083491 | 3/2005 |
| JP | A 2006-312353 | 11/2006 |
| JP | A 2007-166803 | 6/2007 |
| JP | A 2007-247706 | 9/2007 |
| JP | A 2008-195196 | 8/2008 |
| JP | A 2008-286247 | 11/2008 |

OTHER PUBLICATIONS

Jul. 24, 2012 Office Action issued in German Patent Application No. 11 2010 001 550.3 (with translation).

* cited by examiner

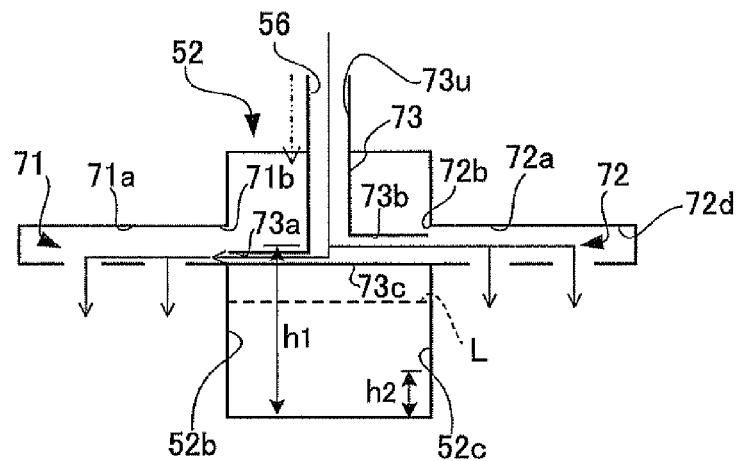
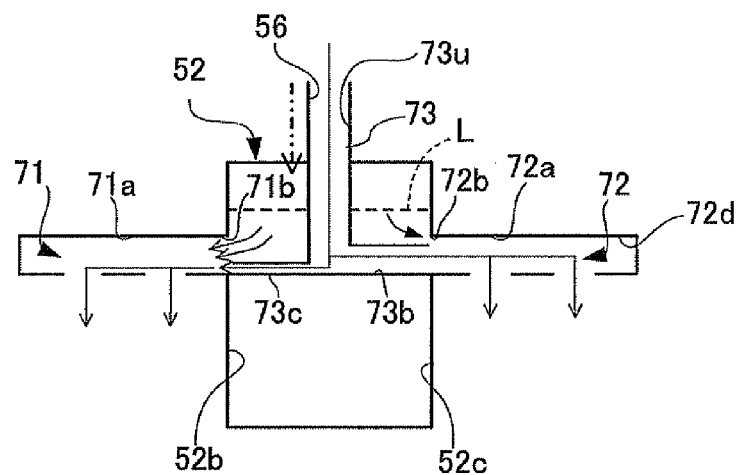
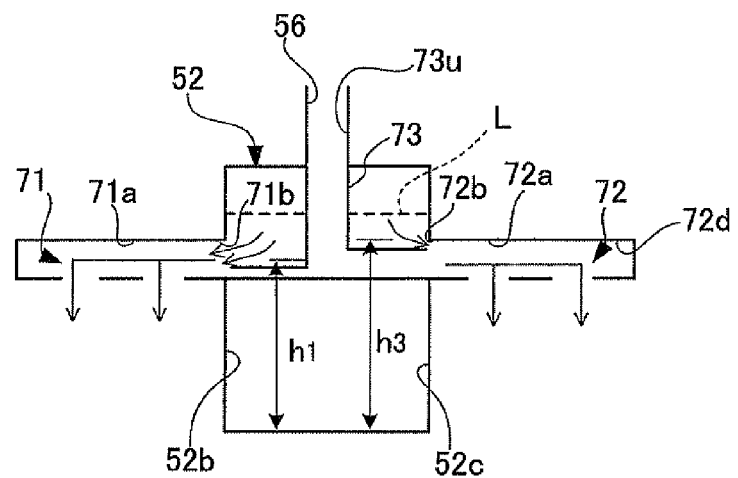

HEAT-GENERATING PORTION COOLING STRUCTURE OF VEHICLE DRIVE APPARATUS

TECHNICAL FIELD

The present invention relates to a heat-generating portion cooling structure of a vehicle drive apparatus, and more particularly to a heat-generating portion cooling structure of a vehicle drive apparatus suitable for the vehicle drive apparatus provided in a case with a catch tank and a pair of heat-generating portions disposed at both sides of the catch tank.

BACKGROUND ART

In a hybrid type vehicle drive apparatus equipped with an internal combustion engine and a rotating machine (such as motor, generator, motor generator), there is provided a transmission case accommodating therein a transmission mechanism, a power splitting mechanism, a differential mechanism, and other operating mechanism in addition to the rotating machine in a highly dense state, so that these mechanisms are required to be sufficiently lubricated and cooled, while the rotating machine is also necessary to be sufficiently cooled. For a vehicle drive apparatus having a plurality of rotating machines such as motor generators and the like (hereinafter, simply referred to as "motor generator"), it is required to properly cool the motor generators to prevent the motor generators from being lowered in efficiency when each of the motor generators is operated with a maximum heat generation amount being produced. For this reason, it is essential to provide a cooling structure for cooling the motor generators and their peripheral portions collectively constituting a heat-generating portion.

As a conventional vehicle drive apparatus provided with this kind of motor cooling structure, there has so far been known a vehicle drive apparatus as follows (see, for example, Patent Documents 1 and 2). The known vehicle drive apparatus comprises a catch tank positioned at the upper portion of a case to introduce and temporarily store therein oil (e.g., automatic transmission fluid) used for lubricating and cooling an electric motor after being drawn from the bottom portion of the case by, for example, a differential ring gear. The oil is gradually discharged from the catch tank to flow down to the operating parts and the heat-generating portions through predetermined lubricating and cooling paths formed in the vehicle drive apparatus to ensure that the operating parts are lubricated and the heat-generating portions are cooled while effectively reducing the loads of large gears and other rotation elements under operation.

Another conventional vehicle drive apparatus (see, for example, Patent Document 3) comprises a cooling system having an oil pump exemplified by a gear pump, and a heat exchanger for exchanging heat with a cooling liquid circulating path in an oil cooler and a radiator to have the oil supplied to the motor generator after the oil is cooled.

Patent Documents

Patent Document 1: Japanese Patent Publication No. 2008-195196

Patent Document 2: Japanese Patent Publication No. 2008-286247

Patent Document 3: Japanese Patent Publication No. 2006-312353

SUMMARY OF INVENTION

Problems to be Solved

The vehicle drive apparatus provided with the conventional motor cooling structure as previously mentioned comprises a power splitting mechanism adapted to have a planetary gear, so that the engine output shaft connected with a carrier is in axial alignment with one side and the other side motor generators. This leads to the fact that the one side motor generator has a maximum heat generated amount mainly at the time of the vehicle traveling at a low speed, while the other side motor generator has a maximum heat generated amount mainly at the time the vehicle is traveling at a high speed.

This means that at the time of the vehicle traveling at a high speed, the amount of oil drawn by the final ring gear and the other neighboring rotation elements is increased. However, there is caused a state in which the motor generator producing the maximum heat generated amount is not sufficiently cooled. On the other hand, at the time the vehicle is traveling at a low speed, there is caused the oil drawn small in amount, resulting in the motor generator producing the maximum heat generated amount being not sufficiently cooled. This makes it necessary to supply the oil to a catch tank from an oil pump as described in Patent Document 3.

Furthermore, in the case that the oil from the oil pump is supplied to the catch tank, it is not possible to supply a sufficient amount of oil to one of the motor generators being not sufficiently cooled, while the oil is wastefully supplied to the other motor generator sufficiently cooled. The previous oil supplying method carried out by the conventional cooling structure cannot be described as being efficient.

On the other hand, it may be considered to provide a valve and a switching mechanism for switching the oil supplying paths of the cooling oil to the motor generators and adjusting the amount of oil to supply more oil to the motor generator lacking the oil in amount. However, there is a possibility that the provision of such the valve and the switching mechanism brings about not only complexity in construction of the apparatus and an increase in manufacturing cost, but also an increase in overall weight of the apparatus and its lowered reliability.

It is, therefore, an object of the present invention to provide a heat-generating portion cooling structure of a vehicle drive apparatus which is simple in construction and can sufficiently supply cooling oil to a heat-generating portion at the time of the heat-generating portion having a maximum heat generated amount, thereby allowing an efficiency of the cooling structure to be enhanced.

Means for Solving Problems

In order to attain the previously mentioned object, (1) a heat-generating portion cooling structure of the vehicle drive apparatus comprises drawing means for drawing oil stored in a case into a catch tank provided in the case; and an oil circulation passage formed in the case for circulating the oil in the case through the catch tank while the oil is being supplied to first and second heat-generating portions respectively positioned at one and the other sides of the catch tank, in which the oil circulation passage comprises a first passage for allowing the oil to flow down to the first heat-generating portion when a surface of the oil in the catch tank is raised to a first height and a second passage for allowing the oil to flow down to the second heat-generating portion when the surface of the oil in the catch tank is raised to a second height lower than the first height, and an amount of oil flowing down to the second heat-generating portion is greater than the amount of oil flowing down to the first heat-generating portion when the surface of the oil in the catch tank is low.

By the heat-generating portion cooling structure thus constructed, the oil can flow down to the second heat-generating portion through the second passage to preferentially cool the second heat-generating portion when the surface of the oil is raised to the second height in the catch tank, while the oil can flow down to the first heat-generating portion through the first passage to sufficiently cool the first heat-generating portion when the surface of the oil is raised to the first height in the catch tank. Therefore, the oil can be preferentially supplied to the second heat-generating portion through the second passage at the time of the amount of oil supply being small and the surface of the oil is raised to the second height but not far beyond that height. This makes it possible to reliably prevent the second heat-generating portion from being insufficiently cooled when the second heat-generating portion has a maximum heat generated amount at the time of the amount of oil supply being small for cooling. As a consequence, the cooling structure thus constructed is simple in construction and, moreover, has no need to be provided with a valve and a switching mechanism for switching oil passages for the cooling oil and adjusting the amounts of oil in the oil passages, thereby making it possible for the cooling structure to be simple in construction.

In the heat-generating portion cooling structure of the vehicle drive apparatus for cooling the heat-generating portions as defined in the above item (1), it is preferable that (2) the first passage have a first opening opened on an inner wall surface of the catch tank and the second passage have a second opening opened on the inner wall surface of the catch tank, and the first and second openings be positioned different from each other in a vertical direction.

By the heat-generating portion cooling structure thus constructed, the cooling structure can be simple in construction only with the positions of the first opening and the second opening differing from each other.

In the heat-generating portion cooling structure of the vehicle drive apparatus for cooling the heat-generating portions as defined in the above item (2), (3) the first passage may have a third opening different from the first opening and opened on the inner wall surface of the catch tank, and the third opening may be positioned to have a vertical height equal to the height of the second opening and has a cross sectional area smaller than that of the second opening.

By the heat-generating portion cooling structure thus constructed, the cooling structure enables an adequate amount of oil to be supplied to the first heat-generating portion through the first passage even when the surface of the oil in the catch tank is raised to the second height. Therefore, the oil can adequately cool the both heat-generating portions in response to the heat generated states of the respective heat-generating portions.

In the heat-generating portion cooling structure of the vehicle drive apparatus for cooling the heat-generating portions as defined in the above item (1), it is preferable that (4) the oil circulation passage further comprise a plurality of oil introduction passages for introducing the oil drawn by the drawing means into the catch tank through a plurality of different paths, the second passage be formed by a passage-forming member having an orifice hole opened toward inside the catch tank and held in communication with either one of the oil introduction passages, and the second passage have a main portion larger in cross section than the orifice hole.

By the heat-generating portion cooling structure thus constructed, the oil can be preferentially supplied to the second heat-generating portion through the second passage while the surface of the oil in the catch tank is raised to a lower height. When the surface of the oil in the catch tank is raised to a higher level, the oil can be sufficiently supplied to the first heat-generating portion through the first passage from the catch tank while the oil introduced into the second passage from the catch tank being limited by the orifice hole. Accordingly, the oil can be sufficiently supplied to each of the first and second heat-generating portions at the time of each of the first and second heat-generating portions having an increased heat generated amount.

In the heat-generating portion cooling structure of the vehicle drive apparatus for cooling the heat-generating portions as defined in the above item (4), it is preferable that (5) the passage-forming member form a conduit bent in the vicinity of the orifice hole such that the second passage has an upstream passage portion upstream of the orifice hole vertically extending above an upper side of the catch tank and a downstream passage portion downstream of the orifice hole horizontally extending to the other side of the catch tank.

By the heat-generating portion cooling structure thus constructed, the oil can be sufficiently supplied to each of the first and second heat-generating portions at the time of each of the first and second heat-generating portions having an increased heat generated amount with a simple passage-forming member, thereby making the cooling structure simple in construction.

In the heat-generating portion cooling structure of the vehicle drive apparatus for cooling the heat-generating portions as defined in the above item (1), (6) the oil circulation passage may further comprise a plurality of oil introduction passages for introducing the oil drawn by the drawing means into the catch tank through a plurality of different paths, one side opening having the first passage opened to the catch tank, and the other side opening having the second passage opened to the catch tank, and in which the catch tank may be provided with a passage-forming member forming either one of the oil introduction passages, the passage-forming member may be formed with one side orifice hole opened at the one side opening and the other side orifice hole opened at the other side opening, and the passage-forming member may be constructed to partly close the one side opening and the other side opening to make the one side opening and the other side opening different in height from each other.

By the heat-generating portion cooling structure thus constructed, the oil can flow down to the second heat-generating portion through the second passage to preferentially cool the second heat-generating portion when the surface of the oil is raised to the second height in the catch tank, while the oil can flow down to the first heat-generating portion through the first passage to sufficiently cool the first heat-generating portion when the surface of the oil is raised to the first height in the catch tank. Therefore, when the amount of oil supply is small and the surface of the oil in the catch tank is raised to the second height but not far beyond the second height, the oil is preferentially supplied to the second heat-generating portion. This makes it possible to reliably prevent the second heat-generating portion from being insufficiently cooled when the second heat-generating portion has a maximum heat generated amount at the time of the amount of oil supply being small for cooling. Moreover, the passage-forming member is constructed in such a manner that the first opening and the second opening are partially closed to the inside of the catch tank to have the substantive heights of the first opening and the second opening different from each other, thereby making it possible to have the first opening and the second opening formed at the same level. As a consequence, the first opening and the second opening can be facilitated in their working or casting processes.

In the heat-generating portion cooling structure of the vehicle drive apparatus for cooling the heat-generating portions as defined in the above item (6), it is preferable that (7) the one side opening have a cross sectional area smaller than that of the other side opening.

By the heat-generating portion cooling structure thus constructed, the oil can be preferentially supplied to the second heat-generating portion through the second passage from a state in which the surface of the oil in the catch tank is at a relatively low level, while the oil can be adequately supplied to the first heat-generating portion through the first passage. The oil in the catch tank is limited from being introduced into the second passage from the second opening partially closed by the passage-forming member, while the oil in the catch tank is not so limited from being introduced into the first passage from the first opening partially closed by the passage-forming member when the surface of the oil in the catch tank is raised to a higher level. Accordingly, the oil can be sufficiently supplied to the first heat-generating portion.

In order to attain the previously mentioned object, (8) an alternative cooling structure of the vehicle drive apparatus comprises drawing means for drawing oil stored in a case into a catch tank provided in the case, and an oil circulation passage formed in the case for circulating the oil in the case through the catch tank while the oil is being supplied to first and second heat-generating portions respectively positioned at one and the other sides of the catch tank, in which the oil circulation passage comprises a plurality of oil introduction passages for introducing the oil drawn by the drawing means into the catch tank through a plurality of different paths, one side opening for allowing the oil to flow down to the first heat-generating portion when a surface of the oil in the catch tank is raised to a first height, and the other side opening for allowing the oil to flow down to the second heat-generating portion when the surface of the oil in the catch tank is raised to a second height, and the catch tank having a partition wall portion inside for separating a first tank portion having the one side opening opened and a second tank portion having the other side opening opened, and in which a ratio of the oil introduced into the first and second tank portions from the oil introduction passages is set such that the surface height of the oil in the first tank portion is always lower than the surface height of the oil in the second tank portion, excluding the time of the oil being full in the first and second tank portions, when the oil is drawn by the drawing means.

By the heat-generating portion cooling structure thus constructed, the oil can flow down to the second heat-generating portion through the second passage to preferentially cool the second heat-generating portion when the surface of the oil is raised to the second height in the catch tank, while the oil can flow down to the first heat-generating portion through the first passage to sufficiently cool the first heat-generating portion when the surface of the oil is raised to the first height in the catch tank. Therefore, the oil can be preferentially supplied to the second heat-generating portion through the second passage at the time of the amount of oil supply being small and the surface of the oil is raised to the second height but not far beyond that height. This makes it possible to reliably prevent the second heat-generating portion from being insufficiently cooled when the second heat-generating portion has a maximum heat generated amount at the time of the amount of oil supply being small for cooling. The volumetric ratio of the first tank portion and the second tank portion can be properly set by the position and the height of the partition wall portion, thereby making it possible to set a most adequate period for having the oil preferentially supplied to the second heat-generating portion. The ratio of the horizontal cross sectional areas of the first tank portion and the second tank portion may be fixed or may be varied in response to the height of the partition wall portion.

In the heat-generating portion cooling structure of the vehicle drive apparatus for cooling the heat-generating portions as defined in the above item (8), it is preferable that (9) the drawing means be operated to increase the drawing amount of oil to the catch tank in response to the increased output of the vehicle drive apparatus.

By the heat-generating portion cooling structure thus constructed, the heat-generating portions can be sufficiently cooled when the vehicle drive apparatus has an increased output and the overall apparatus has an increased heat generated amount.

In the heat-generating portion cooling structure of the vehicle drive apparatus for cooling the heat-generating portions as defined in the above item (9), it is preferable that (10) the drawing means comprise at least one rotation transmission element rotatably received in the case to draw the oil stored in the case to the catch tank, and a pump for pumping the oil stored in the case to the catch tank.

By the heat-generating portion cooling structure thus constructed, the amount of oil stored in the bottom portion of the case can be decreased, thereby making it possible to decrease the rotation resistance of the rotation elements at the time of the rotation elements being rotated at a high speed.

In the heat-generating portion cooling structure of the vehicle drive apparatus for cooling the heat-generating portions as defined in the above item (10), it is preferable that (11) the rotation transmission element be operated to increase its rotation speed in response to the increased output of the vehicle drive apparatus to increase the drawing amount of oil to the catch tank.

By the heat-generating portion cooling structure thus constructed, the drawing amount of oil is increased by the rotation elements when the output of the vehicle drive apparatus is increased so that the supplying amount of oil can be sufficiently secured.

In the cooling structures of the vehicle drive apparatus for cooling the heat-generating portions as defined in the above items (1) to (11), it is preferable that (12) each of the heat-generating portions is constituted by an electric motor capable of generating an electric power.

By the heat-generating portion cooling structure thus constructed, in the vehicle drive apparatus having a plurality of motor generators, each of the motor generators can be suitably cooled, thereby making it possible to reduce the lowering of the efficiency of the vehicle drive apparatus at the time of the motor generators each having a maximum heat generated amount.

Effect of Invention

According to the present invention, the oil can flow down to the second heat-generating portion through the second passage to preferentially cool the second heat-generating portion when the surface of the oil is raised to the second height in the catch tank, while the oil can flow down to the first heat-generating portion through the first passage to sufficiently cool the first heat-generating portion when the surface of the oil is raised to the first height in the catch tank. This makes it possible to reliably prevent the second motor generator from being insufficiently cooled when the second heat-generating portion has a maximum heat generated amount at the time of the amount of oil supply being small for cooling. Therefore, the heat-generating portion cooling structure according to the present invention is yet simple in construction and can enhance the efficiency of the vehicle drive apparatus due to the fact that the oil can be sufficiently supplied to the heat-generating portion at the time of the heat-generating portion having a maximum heat generated amount.

BRIEF DESCRIPTION OF DRAWINGS

FIG. 2 particularly shows oil flows at the time of an EV travel mode traveling at high speed where the surface of the oil in a catch tank is raised to a high level.

FIG. 8A is a cross sectional view of the outlined essential portions of the heat-generating portion cooling structure according to the second embodiment of the present invention but showing a state of the engine travel mode travelling at low speed where the surface of the oil in the catch tank is low.

FIG. 8B is a cross sectional view of the outlined essential portions of the heat-generating portion cooling structure according to the second embodiment of the present invention but showing a state of the engine travel mode travelling at high speed where the surface of the oil in the catch tank is high.

FIG. 8C is a cross sectional view of the outlined essential portions of the heat-generating portion cooling structure according to the second embodiment of the present invention but showing the EV travel mode traveling at high speed where the surface of the oil in the catch tank is high.

DESCRIPTION OF EMBODIMENTS

The preferred embodiments will hereinafter be explained with reference to the accompanying drawings.

First Embodiment

Figure 1:
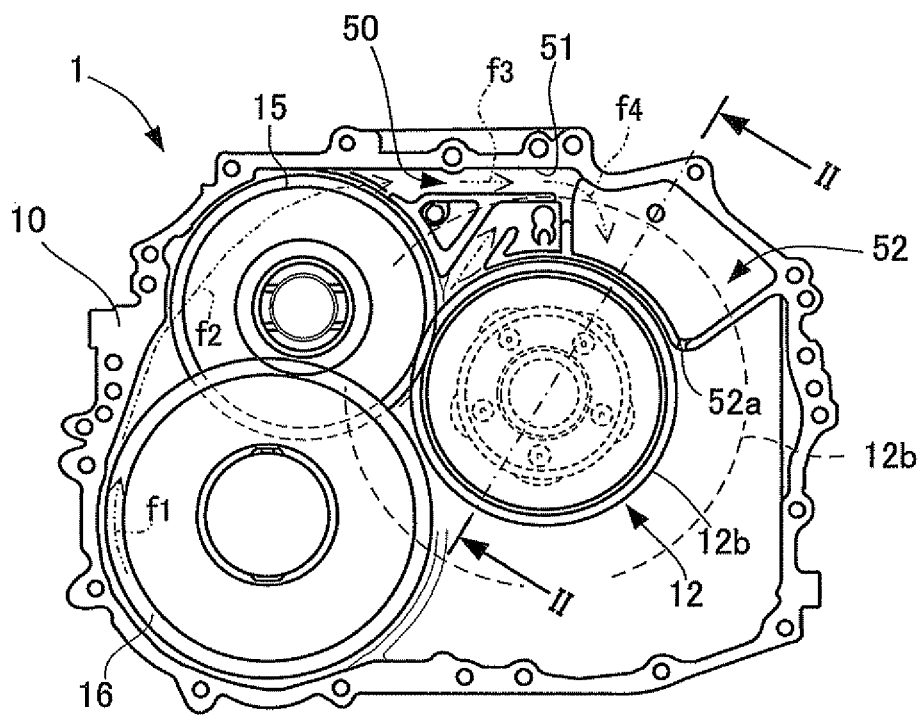
FIG. 1 is an outlined cross sectional view of a vehicle drive apparatus assembled with a heat-generating portion cooling structure according to a first embodiment of the present invention.
Figure 2:
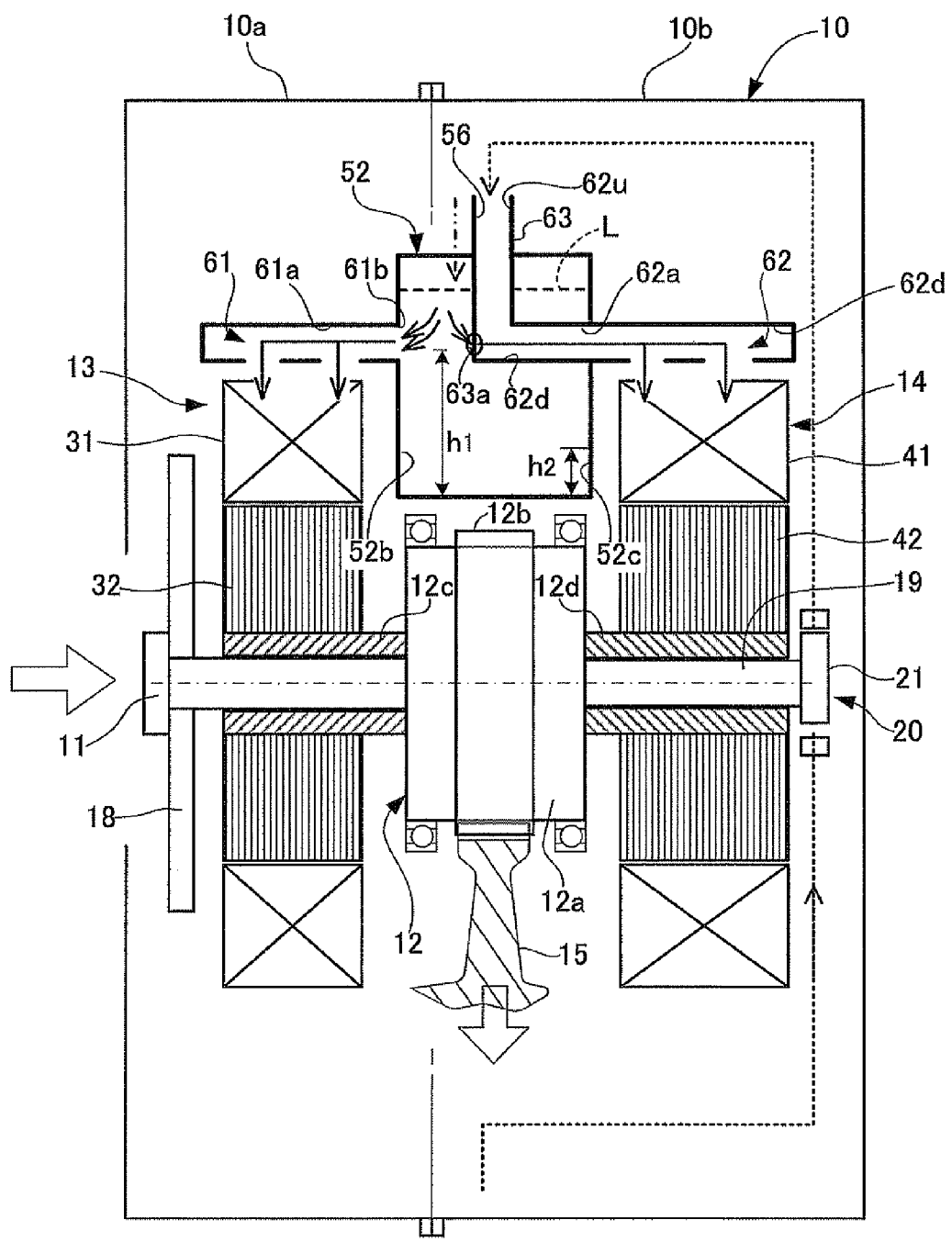
FIG. 2 is a cross sectional view taken on the line II-II of FIG. 1 but schematically showing the essential portions of the heat-generating portion cooling structure according to the first embodiment of the present invention.

FIGS. 1 to 6B show the heat-generating portion cooling structure according to the first embodiment of the present invention. The vehicle drive apparatus according to the present embodiment is to be mounted on a hybrid vehicle and comprises an internal combustion engine (hereinafter, simply referred to as "engine") not shown, and a transaxle 1 (power transmission apparatus) drivably connected to the engine as shown in FIGS. 1 and 2.

The construction will firstly be explained hereinafter.

As shown in FIGS. 1 and 2, the transaxle 1 comprises an input shaft 11 received in a case 10 integrally connected with an engine and drivably connected with an output shaft of the engine, and a pair of output shafts drivably connected with left and right drive wheel shafts, respectively, but not shown in the drawings. The case 10 constitutes part of a transmission case.

The case 10 accommodates therein a pair of planetary gear mechanisms (roughly shown in dotted lines in FIG. 1), which forms part of a power splitting mechanism and a speed reduction mechanism. The case 10 further accommodates therein a known transmission mechanism 12 having a counter drive gear 12b (rotation transmission element) mounted on the outer cylindrical portion 12a integrally connected with a ring gear forming part of each of the planetary gear mechanisms. The case 10 further accommodates therein a first motor generator 13 (first heat-generating portion) drivably connected with an input element 12c of the transmission mechanism 12 facing the power splitting mechanism, and a second motor generator 14 (second heat-generating portion) drivably connected with an input element 12d of the transmission mechanism 12 facing the speed reduction mechanism. The case 10 further accommodates therein a counter driven gear 15 (rotation transmission element) held in mesh with a counter drive gear 12b of the transmission mechanism 12, a differential ring gear 16 (rotation transmission element), and a differential mechanism for inputting the power from the counter driven gear 15 to the differential ring gear 16 (rotation transmission element) to output the power to left and right drive shafts. The first motor generator 13 is arranged at one side of the case 10, while the second motor generator 14 is arranged at the other side of the case 10. The construction itself of the gear train as mentioned above is the same as that of a known gear train.

The operation of the transaxle 1 is adapted to be carried out with an ECU (electronic control unit) for overall control not shown in response to the traveling state of the vehicle and the operation input requested by a driver (for example, an operation request for changing ranges, an acceleration request, and a deceleration request, and other requests requested by a driver). The first motor generator 13 and the second motor generator 14 are controlled by the ECU to be selectively operated as either one of a motor or a generator and to be operated in their respective operating conditions. The engine is designed to be controlled by an engine ECU in cooperation with the ECU for the overall control of the transaxle 1 so that the traveling operation, the stopping operation and other driving conditions can be controlled by the engine ECU.

The input shaft 11 is connected at its outer end portion with the output shaft of the engine through a damper 18 and at its inner end portion with a carrier forming part of the power splitting mechanism of the transmission mechanism 12. The inner end portion of the input shaft 11 allows a rotation transmission shaft 19 to be received therein. The rotation transmission shaft 19 has a central portion received in the second motor generator 14, and an end portion connected with a rotor 21 of an oil pump 20 of a gear pump type or a vane pump type, so that the oil pump 20 can be rotated in response to the rotation of the input shaft 11 to draw lubricating and cooling oil stored in the bottom portion of the case 10.

The first motor generator 13 and the second motor generator 14 (hereinafter, simply referred to as "motor generators 13, 14") have stators 31, 41 and rotors 32, 42, respectively. The stators 31, 41 are secured to the case 10 by a plurality of fixing bolts not shown in the drawings. Each of the stators 31, 41 is constructed by a stator core in the form of a roughly annular shape and made of a plurality of magnetic steel sheets stacked with one another, and a stator coil wound around the stator core, but not shown in the drawings. Each of the rotors 32, 42 is constructed by a rotor body made of a plurality of magnetic steel sheets stacked with one another, and a plurality of permanent magnets embedded in the rotor body in spaced relationship with one another at an equal angle. The motor generator itself thus constructed is the same in construction as those motor generators known in the art.

As shown in FIG. 1, the case 10 is formed with an oil introduction passage 51 capable of introducing the oil drawn from the bottom portion of the case 10 to a catch tank 52. The oil introduction passage 51 is formed with the rotation transmission elements including the differential ring gear 16, the counter driven gear 15, and the counter drive gear 12b (hereinafter, simply referred to as "differential ring gear 16 and the other rotation members"). The oil introduction passage 51 is adapted to guide the oil in the directions respectively shown by arrows f3, f4 after the oil is drawn by the differential ring gear 16 and the other rotation members in the direction shown by an arrow f1 toward the direction f2 so that the oil can be supplied to the catch tank 52 positioned to occupy an upper space in the case 10.

As shown in FIG. 2, the catch tank 52 is positioned at the central portion of the case 10 in the left-right direction thereof, and constituted by a plurality of case members 10a, 10b forming part of the case 10 and integrally connected with each other so that the catch tank 52 serves to store the oil drawn by the differential ring gear 16 and the other rotation members and to gradually let the oil flow down to the counter drive gear 12b and the other elements through oil flow orifices 52a (see FIG. 1) formed at the lowest end portion of the catch tank 52. This means that the catch tank 52 can temporally store the oil drawn by the differential ring gear 16 and the other rotation members and can increase the stored amount of oil as long as the amount of oil surpassing the amount of oil flowing down through the oil flow orifices 52a is successively introduced into the catch tank 52.

The differential ring gear 16, the counter driven gear 15, the counter drive gear 12b, and the oil pump 20 mentioned above constitute as a whole drawing means for drawing the oil stored in the case 10 to the catch tank 52 provided in the case 10. The oil introduction passage 51 and the catch tank 52 constitute an oil circulation passage 50 for circulating the oil in the case 10 through the catch tank 52 while the oil is being supplied to the first heat-generating portion, i.e., first motor generator 13 and the second heat-generating portion, i.e., second motor generator 14 respectively positioned at one and the other sides of the catch tank 52.

The oil circulation passage 50 further comprises a first passage 61 for allowing the oil to flow down to the stator 31 of the first motor generator 13 and its peripheral portion (first heat-generating portion) when the surface L of the oil in the catch tank 52 is raised to a first height h1, and a second passage 62 for allowing the oil to flow down to the stator 41 of the second motor generator 14 and its peripheral portion (second heat-generating portion) when the surface L of the oil in the catch tank 52 is raised to a second height h2 sufficiently lower than the first height h1.

More specifically, the oil circulation passage 50 has an additional oil introduction passage 56 for introducing the oil drawn from the bottom portion of the case 10 by the oil pump 20 into the catch tank 52 in addition to the oil introduction passage 51 for introducing the oil drawn by the differential ring gear 16 and the other rotation members as mentioned above into the catch tank 52. The catch tank 52 is designed such that the surface L of the oil stored therein is raised when the amount of oil introduced from the oil introduction passages 51, 56 exceeds the amount of oil flowing down through the oil flow orifices 52a. The oil introduction passage 51, the catch tank 52, the first passage 61, the second passage 62, and the oil introduction passage 56 constitute as a whole the oil circulation passage 50.

Here, the first passage 61 has a first opening 61b opened on one inner wall surface in the left-right direction, i.e., the inner wall surface 52b of the catch tank 52, and a downflow passage portion 61a extending from the first opening 61b toward one of the both sides in the left-right direction and above the upper half portion of the stator 31 of the first motor generator 13 so that the oil from the catch tank 52 is allowed to flow down to and around the stator 31 of the first motor generator 13 and its peripheral portion. Here, the stator 31 is constructed by a stator core made of a plurality of magnetic steel sheets stacked with one another, and a stator coil wound around the stator core. The stator coil is integrally covered and protected with resin.

The second passage 62 is formed by a passage-forming member 63 having an orifice hole 63a opened toward inside of the catch tank 52 in opposing relationship with the first opening 61b and held in communication with either one of the oil introduction passages 51, 56, for example, the oil introduction passages 56 for introducing the oil into the catch tank 52 from the oil pump 20.

Figure 3:
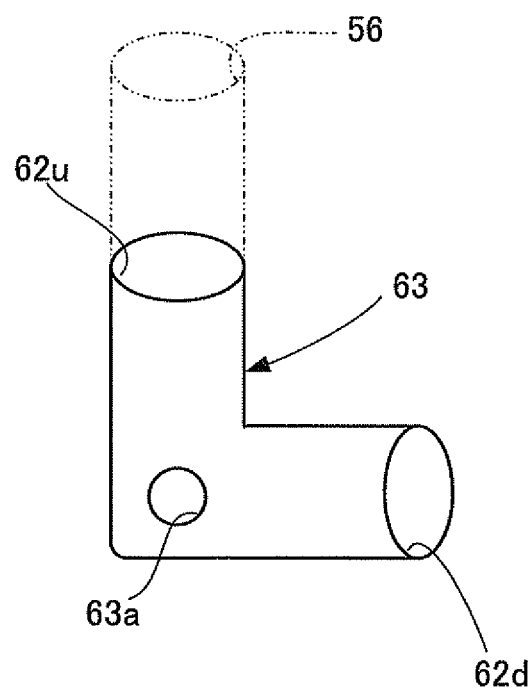
FIG. 3 is a perspective view schematically showing a passage-forming member assembled in the heat-generating portion cooling structure according to the first embodiment of the present invention.
Figure 4A:
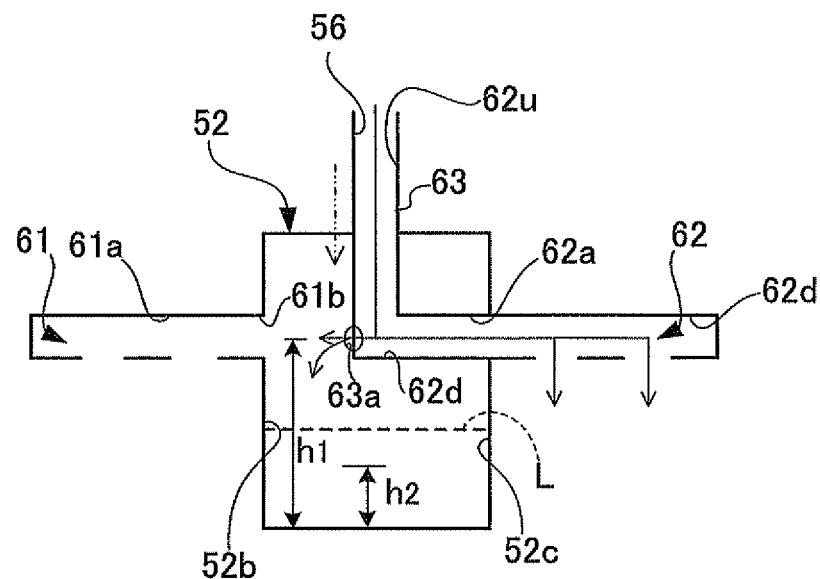
FIG. 4A is a cross sectional view of the outlined essential portions of the heat-generating portion cooling structure according to the first embodiment of the present invention but showing a state of an engine travel mode travelling at low speed where the surface of the oil in the catch tank is low.
Figure 4B:
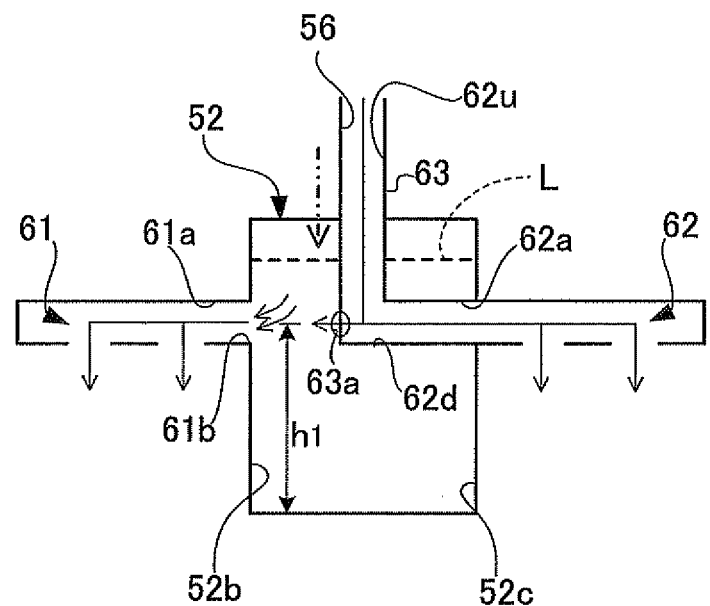
FIG. 4B is a cross sectional view of the outlined essential portions of the heat-generating portion cooling structure according to the first embodiment of the present invention but showing a state of the engine travel mode travelling at high speed where the surface of the oil in the catch tank is high.

As shown in FIGS. 3, 4A and 4B, the second passage 62 has a main portion 62a occupying the overall section from the upstream end connected to the oil introduction passage 56 to the downstream end positioned above the stator 41 of the second motor generator 14. The main portion 62a is larger in cross section than the orifice hole 63a. The second passage 61 has a passage portion 62u at the upstream of the orifice hole 63a to extend above the upper end portion of the catch tank 52, and a downstream side passage portion 62d of the orifice hole 63a to extend from the catch tank 52 toward the other of the both sides in the left-right direction (right direction in FIG. 2) above the upper half portion of the stator 41 of the second motor generator 14. The passage-forming member 63 forms a conduit bent in the form of L-shape in the vicinity of the orifice hole 63a with the second passage 62 thus constructed therein. The passage-forming member 63 is shown in FIG. 2 to be positioned in the catch tank 52. However, the passage portion 62u may be arranged inside or outside of the catch tank 52 along the inner wall surface 52c of the catch tank 52 at the other side of the catch tank 52 in the left-right direction. The passage portion 62u may be designed to be spaced apart from the inner wall surface 52c of the catch tank 52 if the orifice hole 63a passes through the inner wall surface 52c and is arranged in opposing relationship with the first opening 61b.

When the surface L of the oil in the catch tank 52 is higher than the first height h1 in the present embodiment as shown in FIGS. 2 and 4B, the oil can flow into the first passage 61 through the first opening 61b. However, the oil is limited by the orifice hole 63a from flowing into the second passage 62 from the catch tank 52. Therefore, more amounts of oil flow down to the stator 31 of the first motor generator 13.

On the other hand, as shown in FIG. 4A, when the surface L of the oil in the catch tank 52 is lower than the first height h1, the oil from the catch tank 52 does not flow into the first passage 61. The oil passing through the oil introduction passage 56 from the oil pump 20 is introduced into the second passage 62 and is also flowing out to the catch tank 52 from the second passage 62 while being limited by the orifice hole 63a. Therefore, the amount of oil flowing down to the stator 41 of the motor generator 14 becomes more than the amount of oil flowing down to the stator 31 of the motor generator 13.

The second height h2 in the present embodiment is sufficiently smaller than the first height h1, viz., near to zero because the second height h2 is the height of the surface L of the oil at the time of starting the operation of the pump 20. The first passage 61, the second passage 62, and the oil introduction passages 51, 56 may be one or more passages defined by a plurality of case members 10a, 10b of the case 10 having respective concave portions or otherwise a combination of a concave portion and a flat wall portion, one or more passages defined by one or more passage-forming members each including a pipe, a hose and the like attached to the case 10, and one or more passages defined by a plurality of case members 10a, 10b each having a through bore formed therein by drilling or molded to allow the oil to flow therein. The first passage 61, the second passage 62, and the oil introduction passages 51, 56 may be formed in combination of the passages defined in the above. Although the oil pump 20 is a mechanically driven type of oil pump with the rotor 21 being driven by the input shaft 11, the oil pump 20 may be an electrically driven type of oil pump to be controlled in response to the traveling mode of the vehicle, or may be a combination of the mechanically and electrically driven type oil pumps.

Next, the operation will be explained hereinafter.

The heat-generating portion cooling structure of the vehicle drive apparatus constructed as mentioned above is operated to have the engine or at least one of the motor generators 13, 14 activated as a prime mover to generate a vehicle driving force, while any one of the motor generators 13, 14 is activated as a generator to store electric power in a battery out of the drawings.

For example, at the time of the vehicle being started and driven under a light load, the ECU for the overall control of the transaxle 1 and the engine ECU are cooperated and executed in an electric vehicle travel mode (hereinafter, simply referred to as an "EV travel mode") having the second motor generator activated as a travel drive motor to drive the vehicle if the power necessary for the vehicle is below a prescribed value (varies depending on a charge condition). If the power necessary for the vehicle is over the prescribed value, the engine is in turn activated to drive the vehicle. At the time of the engine being operated at a low speed and under a high load, the first motor generator 13 is operated as a generator while the second motor generator 14 is operated as a motor for assisting the power (power assist) to the vehicle.

In the states in which the vehicle is driven to travel by the second motor generator 14 and in which the second motor generator 14 is activated as a motor for assisting the vehicle traveling at a low speed, the second motor generator 14 is operated as a drive motor and has a heat generated amount relatively large as compared with that of the first motor generator 13.

Figure 5A:
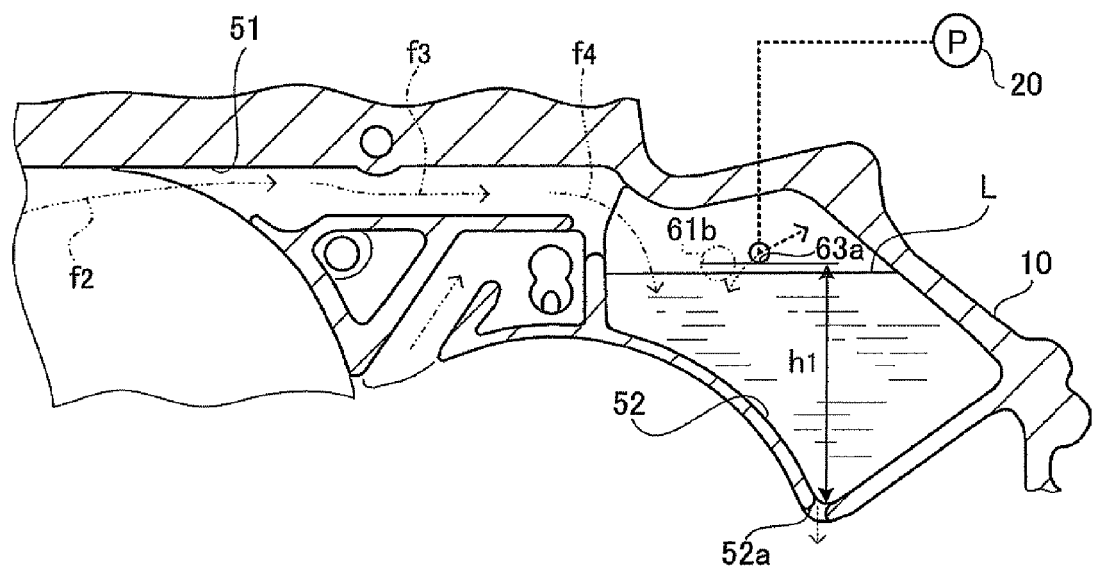
FIG. 5A is a fragmentary side cross sectional view of the peripheral portions of the catch tank assembled in the heat-generating portion cooling structure according to the first embodiment of the present invention but showing a state of the engine travel mode travelling at low speed.

As shown in FIG. 5A, the differential gear 16 and the other rotation elements are at this time rotated at a low rotation speed and thus, the amount of oil drawn by the differential gear 16 and other rotation members is relatively small. Further, the oil pump 20 mechanically operated is at this time operated to draw the oil in response to the rotation speed of the engine, and the oil discharged from the oil pump 20 is introduced into the oil introduction passage 56. The oil then flows from the introduction passage 56 into the second passage 62 and flows down to the second motor generator 14 through the second passage 62 so that the second motor generator 14 can be cooled down. Meanwhile, the oil is also introduced into the catch tank 52 through the orifice hole 63a.

Further, the surface L of the oil in the catch tank 52 comes to the height somewhat lower than a height substantially the same level as the height of the lower half of the first opening 61b of the first passage 61, more specifically, the height h1 that is the height where the oil can be fed to the first motor generator 13, thereby making it possible to supply an adequate amount of oil to the first motor generator 13.

Figure 5B:
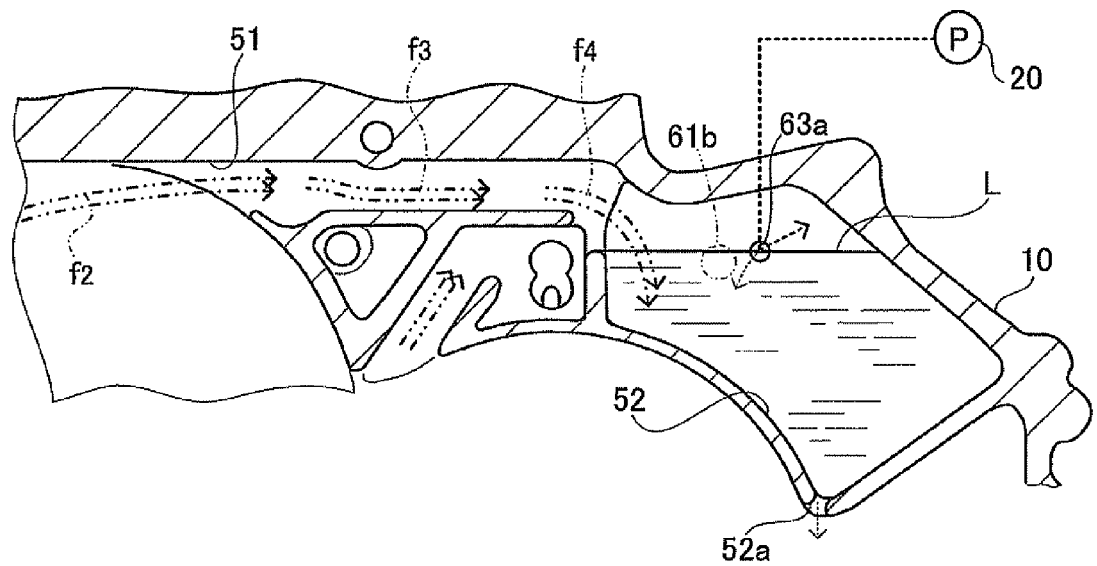
FIG. 5B is a fragmentary side cross sectional view of the peripheral portions of the catch tank assembled in the heat-generating portion cooling structure according to the first embodiment of the present invention but showing a state of the engine travel mode travelling at high speed.

Meanwhile, when the engine is operated to have the vehicle travel in a usual travel mode as shown in FIG. 5B, the first motor generator 13 is controlled to be operated in reverse powering mode so that the engine is operated at a rotation speed excellent in fuel consumption, while the second motor generator 14 is operated as a generator at the time of the battery having a relatively low charge. When the vehicle is accelerated by a driver, travelling on a hill-climbing road, or in other medium to high speed and high load driving operation, the engine is operated at an increased rotation speed for the purpose of the acceleration of the vehicle with the first motor generator 13 being operated as a generator to have an increased rotation speed while the second motor generator 14 is operated to assist the driving force of the engine by the power generated by the first motor generator 13 and the power from the battery. At the time of the regeneration (generation) braking, the first motor generator 13 is controlled to have the engine retain its adequate rotation speed operating in powering or reverse regeneration mode depending on the operating conditions.

In the state that the vehicle is traveling at a relatively high speed where the first motor generator 13 is operated as a generator at a high rotation speed or the operating mode thereof is being switched frequently, the first motor generator 13 has a relatively large heat generated amount as compared with that of the second motor generator 14.

At this time, the amount of oil drawn by the differential ring gear 16 and the other rotation members rotating at a high speed is increased to have the surface L of the oil raised to the degree that the upper half of the first opening 61b is soaked in the oil in the catch tank 52 so the oil in the catch tank 52 flows into the first passage 61 from the first opening 61b while flowing down to the first motor generator 13 through the first passage 61, thereby making it possible to cool the first motor generator 13. Further, the oil is also drawn by the oil pump 20 in response to the rotation speed of the engine and the oil discharged from the oil pump 20 flows into the oil introduction passages 56 while flowing down to the second motor generator 14 through the second passage 62, thereby making it possible to cool the second motor generator 14 in a similar fashion.

Figure 6A:
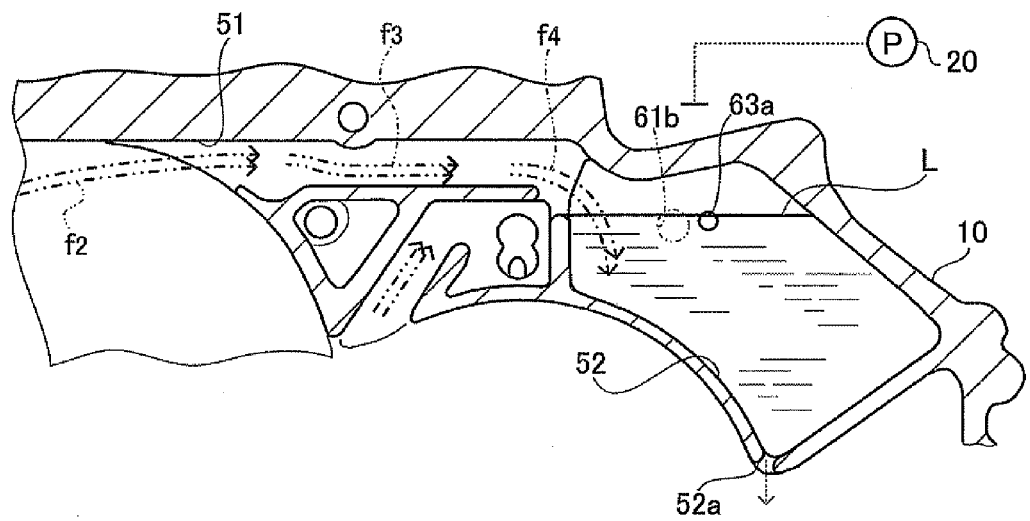
FIG. 6A is a fragmentary side cross sectional view of the peripheral portions of the catch tank assembled in the heat-generating portion cooling structure according to the first embodiment of the present invention but showing a state of the EV travel mode traveling at high speed.
Figure 6B:
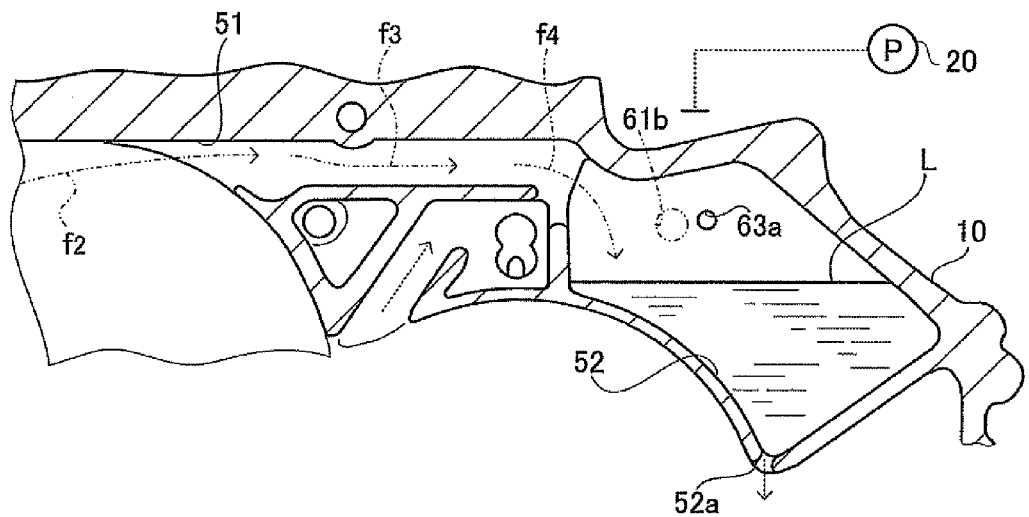
FIG. 6B is a fragmentary side cross sectional view of the peripheral portions of the catch tank assembled in the heat-generating portion cooling structure according to the first embodiment of the present invention but showing a state of the EV travel mode traveling at low speed.

FIGS. 6A and 6B show the peripheral portions of the catch tank 52 in the state of the vehicle traveling in the EV travel mode. When the vehicle is traveling at a relatively high speed in the EV travel mode, as shown in FIG. 6A, the amount of oil drawn by the differential ring gear 16 and the other rotation members is increased, while the oil is not being supplied from the oil pump 20, to have the surface L of the oil raised to the degree that the upper half of the first opening 61b is soaked in the oil in the catch tank 52 so the oil in the catch tank 52 is flown into the first passage 61 while flowing down to the first motor generator 13 through the first passage 61, thereby making it possible to cool the first motor generator 13. Further, the oil in the catch tank 52 flows into the second passage 62 through the orifice hole 63a while flowing down to the second motor generator 14, thereby making it possible to cool the second motor generator 14 also.

When the vehicle is traveling at a relatively low speed in the EV travel mode, as shown in FIG. 6B, almost no amount of oil is supplied from the oil pump 20 and the amount of oil drawn by the differential gear 16 and other rotation members is small so that the surface L of the oil lowers to a position lower than the opening 61b. Therefore, the oil in the catch tank 52 is not used for cooling the first motor generator 13 and the second motor generator 14.

In the cooling structure according to the present embodiment as previously mentioned, when the surface L of the oil is raised to the first height h1 in the catch tank 52, the oil can flow down through the first passage 61 to the first motor generator 13 constituting the first heat-generating portion to cool the first motor generator 13. When the amount of oil supply to the catch tank 52 is small and the surface L of the oil is raised to the second height h2 in the catch tank 52 but not raised far beyond the second height h2, the oil is supplied preferentially to the second motor generator 14 constituting the second heat-generating portion through the second passage 62. Accordingly, the cooling oil can efficiently be distributed to the first motor generator 13 and the second motor generator 14, thereby making it possible to reliably prevent the second motor generator 14 from being insufficiently cooled even if the second motor generator 14 has a maximum heat generated amount at the time of the amount of oil supply being small. Moreover, there is no need to provide a valve and a switching mechanism for switching oil passages for the cooling oil and adjusting the amounts of oil in the oil passages, thereby making it possible for the cooling structure to be simple in construction.

In the cooling structure according to the present embodiment as previously mentioned, the oil circulation passage 50 has a plurality of introduction passages 51, 56 for introducing into the catch tank 52 through different paths the oil drawn by the differential ring gear 16 and the other rotation members and the oil drawn by the pump 20. The second passage 62 is constituted by a passage-forming member 63 having an orifice hole 63a opened to the inside of the catch tank 52 and held in communication with the oil introduction passage 56, and the main portion 62a of the second passage 62 formed by the passage-forming member 63 is larger in cross section than the orifice hole 63a. The oil circulation passage 50 thus constructed leads to the fact that the oil can preferentially be supplied to the second heat-generating portion through the second passage 62 from the state in which the surface L of the oil is low in the catch tank 52, while the oil is sufficiently supplied to the second motor generator 14 through the catch tank 52 in the first passage 61 when the surface L of the oil in the catch tank 52 is high although the oil in the catch tank 52 is limited to flow into the second passage 62 through the orifice hole 63a. Therefore, the cooling oil can be sufficiently supplied to the first motor generator 13 and the second motor generator 14 when the heat generated amounts of the first motor generator 13 and the second motor generator 14 are increased.

Furthermore, in the present embodiment, the passage-forming member 63 forms a conduit bent in the vicinity of the orifice hole 63a with the passage portion 62u at the upstream side of the second passage 62 vertically extending above the upper end of the catch tank 52 and with the downstream side passage portion 62d of the second passage 62 horizontally extending beyond the other side of the catch tank 52, so that the passage-forming 63 is yet simple in construction and can sufficiently supply the cooling oil to the first motor generator 13 and the second generator 14 when the heat generated amounts of the first motor generator 13 and the second motor generator 14 are increased. This results in the fact that the present embodiment can prevent the cooling effect from being lowered in a cooling structure simple in construction.

In addition, the differential ring gear 16 and the other rotation members and the oil pump 20 are designed to increase the drawing amount of oil to the catch tank 52 when the output of the engine and the rotation output of the transaxle 1 are concurrently increased so that the amount of oil supply can be secured to make the cooling operation possible even if the output of the transaxle 1 is increased to have the overall apparatus increased in heating amount.

In particular, the oil drawing means is constituted by at least one rotation element rotatably accommodated in the case 10 to draw the oil stored in the case 10 to the catch tank 52 and the oil pump 20 for drawing the oil stored in the case 10 to the catch tank 52, the rotation element being exemplified by one of the differential ring gear 16, the counter driven gear 15, the counter drive gear 12b, so that the amount of oil stored in the bottom portion of the case 10 can be decreased at the time of the differential ring gear 16 and the other rotation elements being rotated at a high speed, thereby making it possible to reduce the rotation resistance of the differential ring gear 16 and the other rotation elements.

As will be understood from the foregoing description about the present embodiment thus constructed, the oil can flow down to the second motor generator 14 through the second passage 62 to preferentially cool the second motor generator 14 when the surface L of the oil is raised to the second height h2 in the catch tank 52 and then, the oil can flow down to the first motor generator 13 to adequately cool the first motor generator 13 when the surface L of the oil is raised to the first height h1 in the catch tank 52. The present embodiment makes it possible to preferentially supply the oil to the second motor generator 14 through the second passage 62 at the time of the amount of oil supply being small, as well as makes it possible to reliably prevent the second motor generator 14 from being insufficiently cooled when the second motor generator 14 has a maximum heat generated amount at the time of the amount of oil supply being small for cooling. As a consequence, the present embodiment is yet simple in construction and can sufficiently supply the oil for cooling to the second motor generator 14 when the second motor generator 14 has a maximum heat generated amount, so that the efficiency of the transaxle 1 can be enhanced.

Second Embodiment

FIG. 7 and FIGS. 8A to 8C show a heat-generating portion cooling structure according to a second embodiment of the present invention. Here, the heat-generating portion cooling structures according to the second embodiment and the other following embodiments of the present invention each comprises constitution elements similar in construction to those of the heat-generating portion cooling structure according to the first embodiment of the present invention, and therefore the constitution elements of the second embodiment and the following embodiments the same as those of the constitution elements of the first embodiment will be described hereinafter while respectively bearing the same reference numerals and legends shown in FIGS. 1 to 6. Only the following detailed description will be directed to the elements and parts different from those of the first embodiment in the second embodiment and the following embodiments.

In the present second embodiment, the oil circulation passage 50 has a plurality of oil introduction passages 51, 56 for introducing oil into the catch tank 52 through a plurality of different paths the oil drawn by the drawing means.

As shown in FIG. 7 and FIGS. 8A to 8C, the oil circulation passage 50 has a first passage 71 for flowing down the oil to the stator 31 of the first motor generator 13 and its peripheral portion (first heat-generating portion) when the surface L of the oil in the catch tank 52 is raised to the first height h1, and a second passage 72 for flowing down the oil to the stator 41 of the second motor generator 14 and its peripheral portion (second heat-generating portion) when the surface L of the oil in the catch tank 52 is raised to the second height h2 lower than the first height h1.

Here, the first passage 71 has a first opening 71b (one side opening) opened on one inner wall surface in the left-right direction, i.e., the inner wall surface 52b of the catch tank 52, and a downflow passage portion 71a extending from the first opening 71b toward one of the both sides in the left-right direction and above the upper half portion of the stator 31 of the first motor generator 13 so that the oil from the catch tank 52 is allowed to flow down to the stator 31 of the first motor generator 13 and its peripheral portion. Further, the second passage 72 has a main portion 72a from the upstream end connected to the oil introduction passage 56 to the downstream end positioned above the stator 41 of the second motor generator 14, and a second opening 72b (the other side opening) opened on the inner wall surface of the catch tank 52 in opposing relationship with the first opening 71b. In other words, the oil circulation passage 50 has the first opening 71b allowing the first passage 71 opened to the catch tank 52 and the second opening 72b allowing the second passage 72 opened to the catch tank 52.

Figure 7:
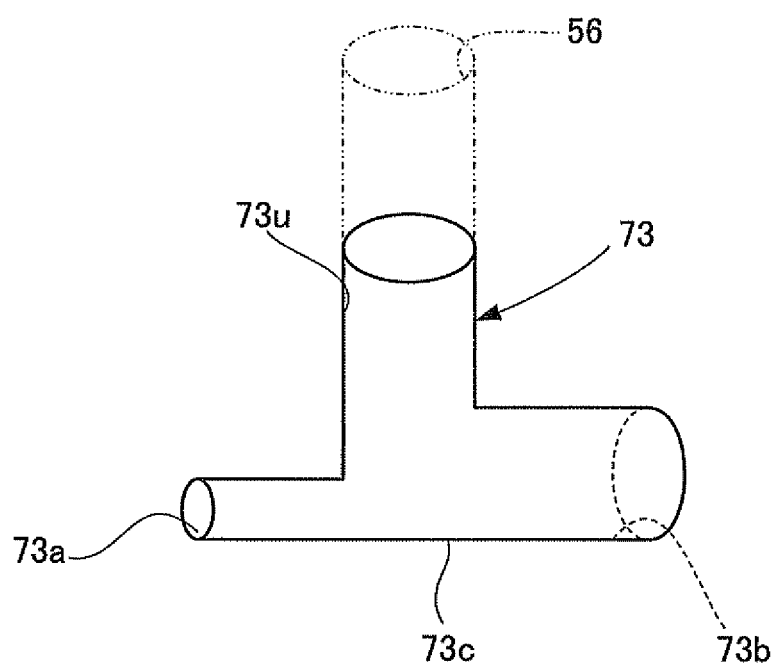
FIG. 7 is a perspective view schematically showing a passage-forming member assembled in the heat-generating portion cooling structure according to a second embodiment of the present invention.

In the catch tank 52, a passage-forming member 73 is provided as shown in FIG. 7. The passage-forming member 73 is formed with an oil introduction passage 56, one of the plurality of oil introduction passages 51, 56, and has a first orifice passage 73a (one of the orifice passages) facing the first opening 71b and a second orifice passage 73b (the other of the orifice passages) facing the second opening 72b. The first orifice passage 73a is smaller in cross sectional area than the second orifice passage 73b. The passage-forming member 73 has a passage portion 73u on upstream side of the second orifice passage 73b. The passage portion 73u vertically extends above the upper end of the catch tank 52 to be held in communication with the oil introduction passage 56, while the first orifice passage 73a is held in communication with the first opening 71b, and the second orifice passage 73b is held in communication with the second opening 72b. Therefore, the passage-forming member 73 is in a roughly inverse T-shape as pespectively shown in FIG. 7.

The passage-forming member 73 is constructed and arranged in such a manner that the first opening 71b and the second opening 72b are partially closed to the inside of the catch tank 52 at the both laterally outer ends of the lower conduit portion 73c extending in the left-right direction of the passage-forming member 73 so that the substantive opening heights of the first opening 71b and the second opening 72b are vertically different from each other, and the cross sectional areas of the first opening 71b and the second opening 72b are also different from each other.

More concretely, the cross sectional area of the first orifice passage 73a opened to the first opening 71b is smaller than the cross sectional area of the second orifice passage 73b opened to the second opening 72b so that the first opening 71b partly occupied by the small diameter end of the lower conduit portion 73c has a substantive opening cross sectional area larger than that of the second opening 72b partly occupied by the large diameter end of the lower conduit portion 73c, and the substantive height of the first opening 71b (vertical center level of the opening) is lower than the substantive height of the second opening 72b.

As will be understood from the foregoing description about the present embodiment thus constructed, the oil from the oil pump 20 is introduced into the second passage 72 from the second opening 72b through the oil introduction passage 56 and the passage portion 73u on the upstream side when the surface L of the oil is raised to the second height h2 sufficiently low in the catch tank 52 as shown in FIG. 8A, so that the oil can flow down to the second motor generator 14 (second heat-generating portion) through the second passage 72 to preferentially cool the second motor generator 14. At this time, the necessary amount of oil is supplied to the first motor generator 13 (first heat-generating portion) through the first passage 71.

On the other hand, when the surface L of the oil become sufficiently high in the catch tank 52 as shown in FIG. 8B, the oil in the catch tank 52 is introduced into the second passage 72 from the second opening 72b limited by the passage-forming member 73, while the oil in the catch tank 52 is introduced into the first passage 71 from the first opening 71b being limited by the passage-forming member 73 not as much as that for the second opening 72b, so that the oil can sufficiently be supplied to the first motor generator 13.

At the time of the vehicle traveling at a relatively high speed in the EV travel mode shown in FIG. 8C, almost no amount of oil is drawn by the oil pump 20. When the surface L of the oil in the catch tank 52 is raised to the first height h1, the oil starts to flow into the first passage 71 from the catch tank 52. When the surface L of the oil in the catch tank 52 is raised to a third height h3 higher than the first height h1, the oil starts to flow into the second passage 72 from the catch tank 52 through the second opening 72b partly occupied by the large diameter end of the lower conduit portion 73c. At this time, the oil is maintained in the preferentially supplying state to flow into the first passage 71 because of the second opening 72b being small in cross sectional area than the first opening 71b.

In the present embodiment, at the time of the vehicle traveling at a relatively low speed where the amount of oil supplied is small and the surface L of the oil is raised to the second height h2 but not far beyond the second height h2, the oil is preferentially supplied to the second motor generator 14 through the second passage 72, thereby making it possible to reliably prevent the second motor generator 14 from being insufficiently cooled when the second motor generator 14 has a maximum heat generated amount at the time of the amount of oil supply being small for cooling. Therefore, the present embodiment can be expected to have an effect the same as that of the first embodiment previously mentioned.

The passage-forming member 73 is constructed and arranged in such a manner that the first opening 71b and the second opening 72b are partially closed to make the substantive heights of the first opening 71b and the second opening 72b different from each other. This allows the first opening 71b and the second opening 72b to be made at the same level when the first opening 71b and the second opening 72b are formed on the wall surface of the catch tank 52, thereby facilitating them to be worked or cast.

The previously mentioned passage-forming member 73 is shown in FIGS. 8A to 8C to have the first opening 71b and the second opening 72b partially closed on the inner wall surfaces 52b, 52c of the catch tank 52. However, the lower conduit portion 73c of the passage-forming member 73 may be partly received in the first passage 71 and the second passage 72 through the first opening 71b and the second opening 72b to have the first opening 71b and the second opening 72b reduced in cross sectional area.

Third Embodiment

Figure 9A:
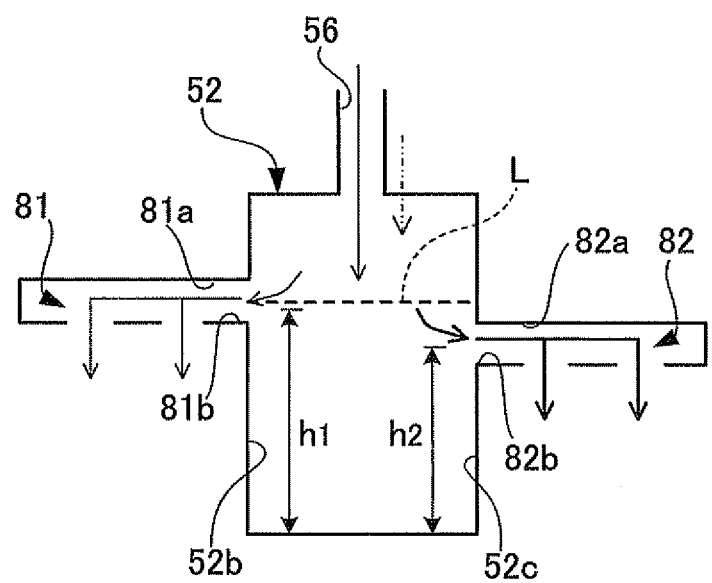
FIG. 9A is a schematic cross sectional view of the essential portions of the heat-generating portion cooling structure according to a third embodiment of the present invention but showing a state of the engine travel mode travelling at low speed.
Figure 9B:
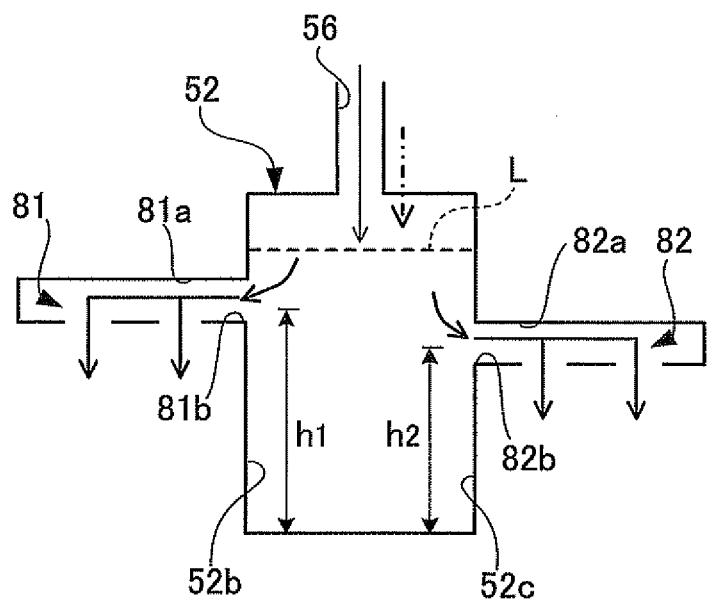
FIG. 9B is a schematic cross sectional view of the essential portions of the heat-generating portion cooling structure according to the third embodiment of the present invention but showing a state of the engine travel mode travelling at high speed.

FIGS. 9A and 9B show a heat-generating portion cooling structure according to a third embodiment of the present invention. In the present embodiment, while the oil circulation passage 50 has a plurality of oil introduction passages 51, 56 for introducing into the catch tank 52 through a plurality of different paths the oil drawn by the drawing means in the same fashion as the first embodiment, no passage-forming member is provided inside the catch tank 52.

In the present embodiment, the oil circulation passage 50 has a first passage 81 for flowing down the oil to the stator 31 of the first motor generator 13 and its peripheral portion (first heat-generating portion) when the surface L of the oil in the catch tank 52 is raised to the first height h1, and a second passage 82 for flowing down the oil to the stator 41 of the second motor generator 14 and its peripheral portion (second heat-generating portion) when the surface L of the oil in the catch tank 52 is raised to the second height h2 lower than the first height h1.

Here, the first passage 81 has a first opening 81b (one side opening) opened on one inner wall surface in the left-right direction, i.e., the inner wall surface 52b of the catch tank 52, and a downflow passage portion 81a extending from the first opening 81b toward one of the both sides (left side in FIG. 2) in the left-right direction and above the upper half of the stator 31 of the first motor generator 13. When the vehicle is traveling at a relatively high speed where the surface L of the oil is raised high in the catch tank 52 as shown in FIG. 9B, the oil from the catch tank 52 can flow down to and sufficiently cool the stator 31 of the first motor generator 13 and its peripheral portion (first heat-generating portion), at the time of maximum heat generation on the first motor generator 13.

The second passage 82 on the other side in the left-right direction of the catch tank 52 has a second opening 82b (the other side opening) opened on the other side inner wall surface 52c of the catch tank 52, and a downflow passage portion 81a extending from the first opening 82b toward the other side (right side in FIG. 2) in the left-right direction and above the upper half of the stator 41 of the second motor generator 14, so that the oil is allowed to flow down to and around the stator 41 of the second motor generator 14 and its peripheral portion from the catch tank 52 when the vehicle is traveling at a relatively low speed with the surface L of the oil being lowered in the catch tank 52 as shown in FIG. 9A. It is therefore understood that the stator 41 of the second motor generator 14 and its peripheral portion can be fully cooled at the time of maximum heat generation on the second motor generator 14.

In the present embodiment, the first opening 81b and the second opening 82b are opened at respective opening positions vertically different from each other.

In the present embodiment similar to the foregoing embodiments, the oil can flow down to the second motor generator 14 through the second passage 82 to preferentially cool the second motor generator 14 when the surface L of the oil is raised to the second height h2 in the catch tank 52, while the oil can flow down to the first motor generator 13 through the first passage 81 to sufficiently cool the first motor generator 13 when the surface L of the oil is raised to the first height h1 in the catch tank 52. The present embodiment makes it possible to preferentially supply the oil to the second motor generator 14 through the second passage 82 at the time of the amount of oil supply being small, as well as makes it possible to reliably prevent the second motor generator 14 from being insufficiently cooled when the second motor generator 14 has a maximum heat generated amount at the time of the amount of oil supply being small for cooling. As a consequence, the present embodiment is yet simple in construction and can sufficiently supply the oil to the second motor generator 14 when the second motor generator 14 has a maximum heat generated amount, so that the efficiency of the transaxle 1 can be enhanced. Therefore, the present embodiment can be expected to have an effect the same as that of the first embodiment previously mentioned.

The present embodiment is constructed in such a manner that the first opening 81b and the second opening 82b are opened at their respective opening positions vertically different from each other, so that the present embodiment can be simple in construction as it only needs to differentiate the respective opening positions of the first opening 81b and the second opening 82b from each other on the inner wall surfaces 52b, 52c of the catch tank 52.

Fourth Embodiment

Figure 10A:
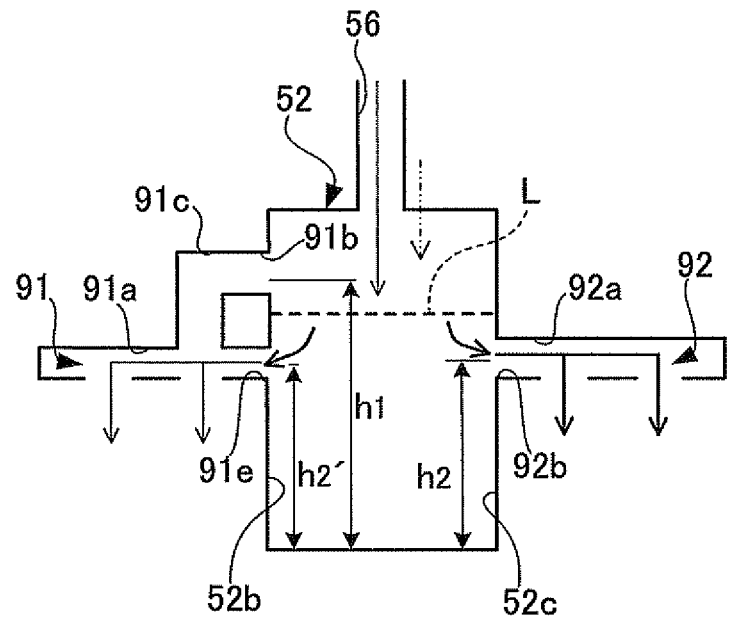
FIG. 10A is a schematic cross sectional view of the essential portions of the heat-generating portion cooling structure according to a fourth embodiment of the present invention but showing a state of the engine travel mode travelling at low speed.
Figure 10B:
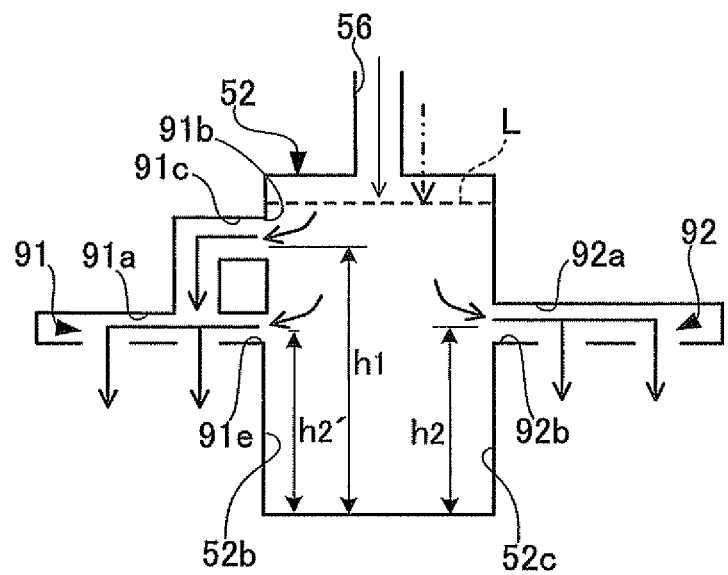
FIG. 10B is a schematic cross sectional view of the essential portions of the heat-generating portion cooling structure according to the fourth embodiment of the present invention but showing a state of the engine travel mode travelling at high speed.

FIGS. 10A and 10B show a heat-generating portion cooling structure according to a fourth embodiment of the present invention. The present embodiment is constructed in a similar fashion to the third embodiment except for having a third downflow passage in addition to the first passage and the second passage.

in the present embodiment, the oil circulation passage 50 has a first passage 91 for flowing down the oil to the stator 31 of the first motor generator 13 and its peripheral portion (first heat-generating portion) when the surface L of the oil in the catch tank 52 is raised to the first height h1, and a second passage 92 for flowing down the oil to the stator 41 of the second motor generator 14 and its peripheral portion (second heat-generating portion) when the surface L of the oil in the catch tank 52 is raised to the second height h2 lower than the first height h1.

Here, the first passage 91 on one side in the left-right direction has two openings opened on one inner wall surface 52b of the catch tank 52, i.e., a first opening 91b and a third opening 91e (one side opening), and downflow passage portions 91a, 91c (third downflow passage) extending from the first opening 91b and the third opening 91e toward one of the both sides (left side in FIG. 2) in the left-right direction and above the upper half of the stator 31 of the first motor generator 13. When the vehicle is traveling at a relatively high speed with the surface L of the oil being raised high in the catch tank 52 as shown in FIG. 10B, the oil can flow down and sufficiently cool the stator 31 of the first motor generator 13 and its peripheral portion (first heat-generating portion) at the time of maximum heat generation on the first motor generator 13.

The second passage 92 at the other side in the left-right direction of the catch tank 52 has a second opening 92b (the other side opening) opened on the other side inner wall surface 52c of the catch tank 52, and a downflow passage portion 92a extending from the first opening 92b toward the other side (right side in FIG. 2) in the left-right direction and above the upper half of the stator 41 of the second motor generator 14, so that the oil is allowed to flow down to the stator 41 of the second motor generator 14 and its peripheral portion from the catch tank 52 when the vehicle is traveling at a relatively low speed with the surface L of the oil being lowered in the catch tank 52 as shown in FIG. 10A, so that the stator 41 of the second motor generator 14 and its peripheral portion can be sufficiently cooled at the time of maximum heat generation on the second motor generator 14.

In the present embodiment, the opening height h2' of the opening 91e (third opening) and the opening height h2 of the opening 92b (second opening) are at the same level in the vertical direction. However, the opening height h1 of the opening 91b (first opening) is set at a sufficiently high level with respect to the second opening 92b. Therefore, the oil can be supplied to the stator 31 of the first motor generator 13 only through the downflow passage portion 91a when the vehicle is traveling at a relatively low speed with the surface L of the oil being lowered in the catch tank 52.

In the present embodiment similar to the foregoing embodiments, the oil can flow down to the second motor generator 14 through the second passage 92 to preferentially cool the second motor generator 14 when the surface L of the oil is raised to the second height h2 in the catch tank 52, while the oil can flow down to the first motor generator 13 through the first passage 91 to sufficiently cool the first motor generator 13 when the surface L of the oil is raised to the first height h1 in the catch tank 52. The present embodiment makes it possible to preferentially supply the oil to the second motor generator 14 through the second passage 92 at the time of the amount of oil supply being small, as well as makes it possible to reliably prevent the second motor generator 14 from being insufficiently cooled when the second motor generator 14 has a maximum heat generated amount at the time of the amount of oil supply being small for cooling. As a consequence, the present embodiment is yet simple in construction and can sufficiently supply the oil to the second motor generator 14 when the second motor generator 14 has a maximum heat generated amount, so that the efficiency of the transaxle 1 can be enhanced. Therefore, the present invention can be expected to have an advantageous effect the same as that of the first embodiment.

Furthermore, in the present invention, the first passage 91 has the opening 91e opened on one inner wall surface 52b of the catch tank 52 in addition to the opening 91b. The opening 91e is opened at the opening height h2' the same as the opening height h2 of the opening 92b and is smaller in cross sectional area than the opening 92b, thereby making it possible to supply an adequate amount of oil to the motor generator 13 through the first passage 91 from the state in which the surface L of the oil in the catch tank 52 is raised to a relatively low level, i.e., the second height h2. Therefore, the oil can appropriately cool the first motor generator 13 and the second motor generator 14 in response to the heat generated states of the first motor generator 13 and the second motor generator 14.

Fifth Embodiment

Figure 11:
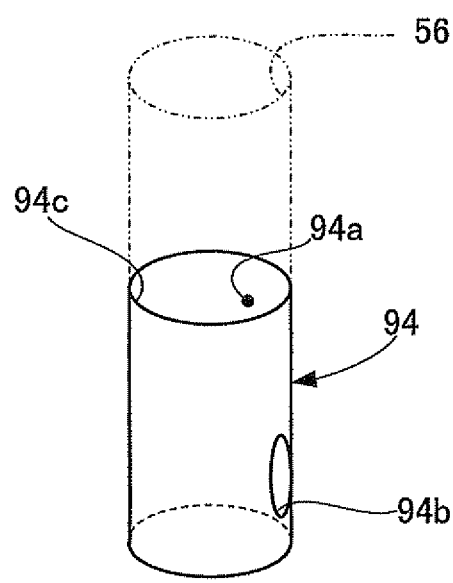
FIG. 11 is a perspective view schematically showing a passage-forming member assembled in the heat-generating portion cooling structure according to a fifth embodiment of the present invention.
Figure 12A:
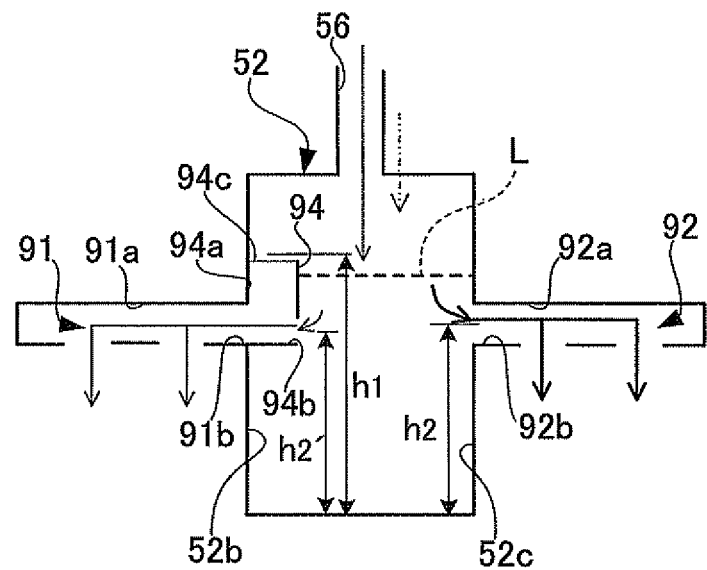
FIG. 12A is a schematic cross sectional view of the essential portions of the heat-generating portion cooling structure according to the fifth embodiment of the present invention but showing a state of the engine travel mode travelling at low speed.
Figure 12B:
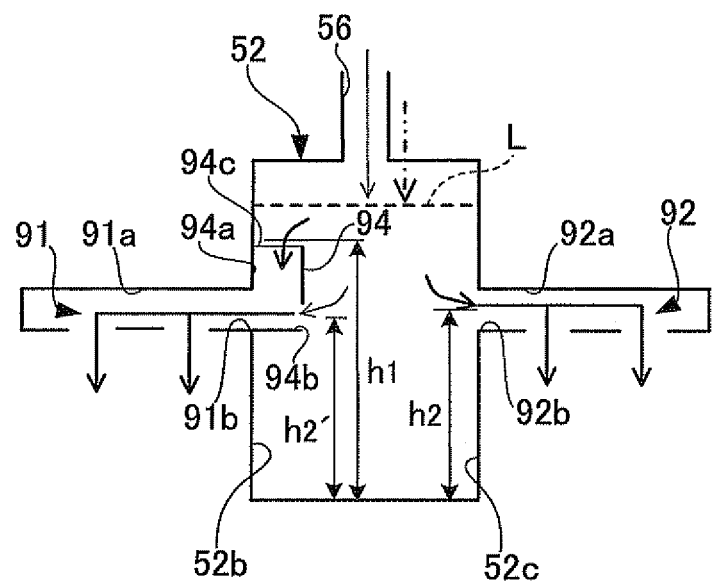
FIG. 12B is a schematic cross sectional view of the essential portions of the heat-generating portion cooling structure according to the fifth embodiment of the present invention but showing a state of the engine travel mode travelling at high speed.

FIGS. 11, FIGS. 12A and 12B show a heat-generating portion cooling structure according to a fifth embodiment of the present invention. The present embodiment is constructed to have a passage-forming member 94 provided in the catch tank 52 in lieu of the downflow passage 91c, and to have other elements or parts similar in construction to the fourth embodiment previously mentioned.

The passage-forming member 94 is in a bottomed cylindrical shape, and arranged in the catch tank 52 at a position where the first passage 91 is opened to the catch tank 52. The passage-forming member 94 is formed with a vertical passage 94a vertically extending along the inner wall surface 52b of the catch tank 52 to be held in communication with the downflow passage portion 91a of the first passage 91, an orifice hole 94b having the first passage 91 opened to the inside of the catch tank 52 at the lower end side of the vertical passage 94a, and an opening 94c opened at the upper end side of the vertical passage 94a.

The opening 94c of the passage-forming member 94 forming part of the first passage 91 is opened in perpendicular relationship with the one side inner wall surface 52b of the catch tank 52, and the orifice hole 94b is opened in parallel relationship with the one side inner wall surface 52b of the catch tank 52 and in opposing relationship with the second passage 92.

The first passage 91 has a first opening 91b opened on one inner wall surface 52b of the catch tank 52, and a downflow passage portion 91a extending from the first opening 91b toward one of the both sides (left side in FIG. 2) in the left-right direction and above the upper half of the stator 31 of the first motor generator 13. When the vehicle is traveling at a relatively high speed with the surface L of the oil being raised high in the catch tank 52 as shown in FIG. 12B, the oil from the catch tank 52 can flow down to and sufficiently cool the stator 31 of the first motor generator 13 and its peripheral portion (first heat-generating portion) at the time of maximum heat generation on the first motor generator 13.

The second passage 92 has a second opening 92b opened on the other side inner wall surface 52c of the catch tank 52, and a downflow passage portion 92a extending from the first opening 92b toward the other side, i.e., the right side in FIGS. 12A and 12B, in the left-right direction and above the upper half of the stator 41 of the second motor generator 14, so that the oil is allowed to flow down to the stator 41 of the second motor generator 14 and its peripheral portion. When the vehicle is traveling at a relatively low speed with the surface L of the oil being lowered in the catch tank 52 as shown in FIG. 12A, for example, when the surface L of the oil in the catch tank 52 is raised to the second height h2 lower than the first height h1, the oil from the catch tank 52 can sufficiently flow down to the stator 41 of the second motor generator 14 and its peripheral portion, thereby sufficiently cooling the stator 41 of the second motor generator 14 and its peripheral portion at the time of maximum heat generation on the second motor generator 14.

In the present embodiment, while the opening height h2' of the orifice hole 94b (third opening) and the opening height h2 of the opening 92b (second opening) are at the same level, the opening height of the opening 94c (first opening) is set at a sufficiently high level with respect to the second opening 92b.

In the present embodiment similar to the foregoing embodiments, the oil can flow down to the second motor generator 14 through the second passage 92 to preferentially cool the second motor generator 14 when the surface L of the oil is raised to the second height h2 in the catch tank 52, while the oil can flow down to the first motor generator 13 through the first passage 91 to sufficiently cool the first motor generator 13 when the surface L of the oil is raised to the first height h1 in the catch tank 52. The present embodiment makes it possible to preferentially supply the oil to the second motor generator 14 through the second passage 92 at the time of the amount of oil supply being small, as well as makes it possible to reliably prevent the second motor generator 14 from being insufficiently cooled when the second motor generator 14 has a maximum heat generated amount at the time of the amount of oil supply being small for cooling. As a consequence, the present embodiment is yet simple in construction and can sufficiently supply the oil to the second motor generator 14 when the second motor generator 14 has a maximum heat generated amount, so that the efficiency of the transaxle 1 can be enhanced. The present embodiment can be expected to have an advantageous effect the same as that of the first embodiment.

Furthermore, in the present invention, the first passage 91 has an orifice hole 94b opened in opposing relationship with the second opening 92b. The orifice hole 94b is opened at the opening height h2' the same as the opening height h2 of the opening 92b and is smaller in cross sectional area than the opening 92b, thereby making it possible to supply an adequate amount of oil to the motor generator 13 through the first passage 91 from the state in which the surface L of the oil in the catch tank 52 is raised to a relatively low level, i.e., the second height h2. Therefore, the oil can appropriately cool the first motor generator 13 and the second motor generator 14 in response to the heat generated states of the first motor generator 13 and the second motor generator 14.

Sixth Embodiment

Figure 13A:
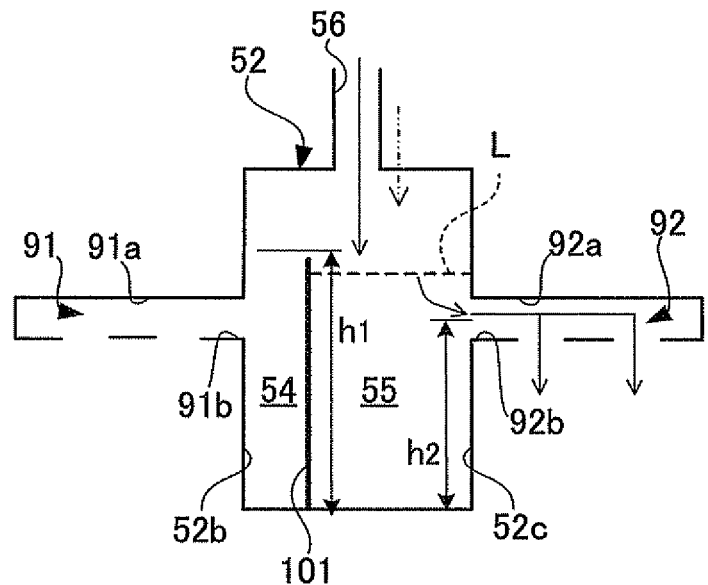
FIG. 13A is a schematic cross sectional view of the essential portions of the heat-generating portion cooling structure according to a sixth embodiment of the present invention but showing a state of the engine travel mode travelling at low speed.
Figure 13B:
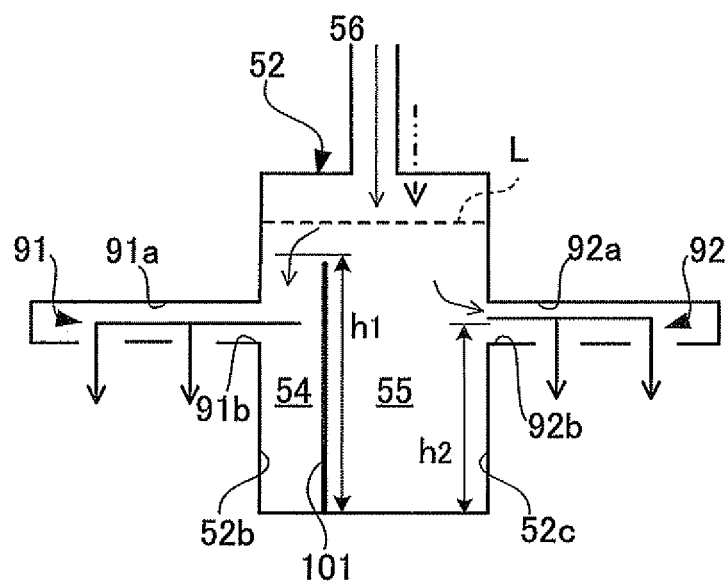
FIG. 13B is a schematic cross sectional view of the essential portions of the heat-generating portion cooling structure according to the sixth embodiment of the present invention but showing a state of the engine travel mode travelling at high speed.

FIGS. 13A and 13B show a heat-generating portion cooling structure according to a sixth embodiment of the present invention. The present embodiment is constructed with the catch tank 52 divided into two partitions, left and right.

In the present embodiment, the oil circulation passage 50 has a plurality of oil introduction passages 51, 56, one side opening 91b opened on the one inner wall surface 52b of the catch tank 52 to have the oil flow down to the stator 31 of the second generator motor 13 and its peripheral portion when the surface L of the oil is raised to the first height h1 in the catch tank 52, and the other side opening 92b opened on the other side inner wall surface 52c of the catch tank 52 to have the oil flow down to the stator 41 of the second generator motor 14 and its peripheral portion when the surface L of the oil is raised to the second height h2 in the catch tank 52.

The catch tank 52 has a partition wall portion 101 for separating a first tank portion 54 having the one side opening 91b opened to the inside of the catch tank 52, and a second tank portion 55 having the other side opening 92b opened to the inside of the catch tank 52. The partition wall portion 101 serves to initially store in the second tank portion 55 the oil introduced through the oil introduction passages 51, 56 when the oil is drawn by the differential ring gear 16 and other rotation members and the oil pump 20 constituting the drawing means, and to store the oil in the first tank portion 54 after the second tank portion 55 is filled with the oil.

The ratio of the amounts of oil respectively introduced into the first tank portion 54 and the second tank portion 55 from the oil introduction passages 51, 56 is set such that the surface height of the oil in the first tank portion 54 is always lower than the surface height of the oil in the second tank portion 55, excluding the time of the oil being full in the first tank portion 54 and the second tank portion 55.

In the cooling structure according to the present embodiment thus constructed, the oil can flow down to the stator 41 of the second motor generator 14 through the other side opening 92b to preferentially cool the second motor generator 14 when the surface L of the oil is raised to the second height h2 in the second tank portion 55 of the catch tank 52. On the other hand, the oil can flow down to the first motor generator 13 through the one side opening 91b to sufficiently cool the first motor generator 13 when the surface L of the oil is raised to the first height h1 in the catch tank 52 with the oil overflowed from the second tank portion 55 being stored in the first tank portion 54 after the second tank portion 55 is full with oil.

Therefore, when the amount of oil supply is small and the surface L of the oil reaches the second height h2 in the catch tank 52 but not rises far beyond the second height h2, the oil can be preferentially supplied to the second motor generator 14 through the other side opening 92b. As a consequence, the present embodiment makes it possible to reliably prevent the second motor generator 14 from being insufficiently cooled when the second motor generator 14 has a maximum heat generated amount. Therefore, the present embodiment can be expected to have an advantageous effect the same as that of the first embodiment.

The volumetric ratio of the first tank portion 54 and the second tank portion 55 can be properly set by the position and the height of the partition wall portion 101, thereby making it possible to set a most appropriate period of time to allow the oil to be preferentially supplied to the second motor generator 14.

The ratio of the horizontal cross sectional areas of the first tank portion 54 and the second tank portion 55 is shown in FIGS. 13A and 13B to be set at a constant value irrespective of the height of the partition wall portion 101. However, the ratio of the horizontal cross sectional areas of the first tank portion 54 and the second tank portion 55 may be varied in response to the height of the partition wall portion 101 according to the present invention.

Although the previously mentioned embodiments have been explained and are shown in the drawings as being each constructed to have the oil introduced into the catch tank 52 through the oil introduction passage 56 from the oil pump 20, the oil may be introduced into the oil introduction passage 56 from an oil cooler and other oil pumping means provided outside of the cooling structure without using the oil pump 20 according to the present invention.

Though the previously mentioned embodiments are each constructed to have the first motor generator 13 specified as the first heat-generating portion and the second motor generator 14 specified as the second heating generating portion, the above first and second heat-generating portions are not limited to the first and second heating generating portions 13, 14, respectively, but may include either one of a motor or a generator, an inverter, and other members or parts having electrically heat generating sources mounted thereon. It is therefore understood that the present invention is not limited to the heat-generating portion cooling structure of the vehicle drive apparatus of the type with two motors.

As will be understood from the foregoing description, the heat-generating portion cooling structure according to the present invention is constructed to enable the oil to flow down to the second heat-generating portion through the second passage to cool the second heat-generating portion when the surface of the oil in the catch tank is raised to a relatively low second height and to enable the oil to flow down to the first heat-generating portion through the first passage to cool the first heat-generating portion when the surface of the oil in the catch tank is raised to a relatively high first height, so that the oil can be preferentially supplied to the second heat-generating portion through the second passage at the time of the amount of oil supply being small, thereby making it possible to reliably prevent the second heat-generating portion from being insufficiently cooled when the second heat-generating portion has a maximum heat generated amount while the amount of oil supply is small. Therefore, the heat-generating portion cooling structure according to the present invention is simple in construction and can enhance the efficiency of the vehicle drive apparatus due to the fact that the oil can be sufficiently supplied to the heat-generating portion at the time of the heat-generating portion having a maximum heat generated amount. The present invention is useful for the heat-generating portion cooling structure of the vehicle drive apparatus in general, and especially suitable for the heat-generating portion cooling structure of the vehicle drive apparatus provided in a case with a catch tank and heat-generating portions positioned at the both sides of the catch tank.

EXPLANATION OF REFERENCE NUMERALS

1: transaxle (vehicle drive apparatus, power transmission apparatus)
10: case (transmission case)
11: input shaft
12: transmission mechanism (power splitting mechanism, reduction mechanism)
12b: counter drive gear (rotation transmission element, drawing means)
13: first motor generator (first heat-generating portion, electric motor capable of generating power)
14: second motor generator (second heat-generating portion, electric motor capable of generating power)
15: counter driven gear (rotation transmission element, drawing means)
16: differential ring gear (rotation transmission element, drawing means)
20: oil pump (drawing means)
31, 41: stator
50: oil circulation passage
51, 56: oil introduction passage (a plurality of oil introduction passage)
52: catch tank
52b: one side inner wall surface
52c: the other side inner wall surface
54: first tank portion
55: second tank portion
61, 71, 81, 91: first passage
61a, 71a, 81a, 82a, 91a, 91c, 92a: downflow passage portion
61b, 71b, 81b, 91b: opening (first opening, one side opening)
62, 72, 82, 92: second passage
62a, 72a: main portion
62d: downstream side passage portion
63, 73, 94: passage-forming member
63a: orifice hole
72b, 82b, 92b: opening (second opening, the other side opening)
73a, 73b: orifice passage (orifice hole)
73c: lower conduit portion
91e: opening (third opening, one side opening)
94a: vertical passage
94b: orifice hole (third opening)
94c: opening
101: partition wall portion

The invention claimed is:

1. A heat-generating portion cooling structure comprising:
a drawing unit confirmed to draw oil stored in a case into a catch tank provided in the case; and
an oil circulation passage fowled in the case configured to circulate the oil in the case through the catch tank while the oil is being supplied to first and second heat-generating portions respectively positioned at one and the other sides of the catch tank, the oil circulation passage comprising
a first passage configured to allow the oil to flow down to the first heat-generating portion when a surface of the oil in the catch tank is raised to a first height, the first passage having a first opening opened on an inner wall surface of the catch tank and a third opening different from the first opening and opened on the inner wall surface of the catch tank, and
a second passage configured to allow the oil to flow down to the second heat-generating portion when the surface of the oil in the catch tank is raised to a second height lower than the first height, the second passage having a second opening opened on the inner wall surface of the catch tank,
wherein an amount of oil flowing down to the second heat-generating portion is greater than the amount of oil flowing down to the first heat-generating portion when the surface of the oil in the catch tank is raised to the second height while not being raised to the first height,
wherein the first and second openings are positioned different from each other in a vertical direction, and
wherein the third opening is positioned to have a vertical height equal to the height of the second opening and the third opening has a cross sectional area smaller than that of the second opening.

2. A heat-generating portion cooling structure comprising:
a drawing unit configured to draw oil stored in a case into a catch tank provided in the case; and
an oil circulation passage formed in the case configured to circulate the oil in the case through the catch tank while the oil is being supplied to first and second heat-generating portions respectively positioned at one and the other sides of the catch tank, the oil circulation passage comprising
a first passage configured to allow the oil to flow down to the first heat-generating portion when a surface of the oil in the catch tank is raised to a first height,
a second passage configured to allow the oil to flow down to the second heat-generating portion when the surface of the oil in the catch tank is raised to a second height lower than the first height, and
a plurality of oil introduction passages configured to introduce the oil drawn by the drawing unit into the catch tank through a plurality of different paths,
wherein an amount of oil flowing down to the second heat-generating portion is greater than the amount of oil flowing down to the first heat-generating portion when the surface of the oil in the catch tank is raised to the second height while not being raised to the first height, and
wherein the second passage is formed by a passage-forming member having an orifice hole opened toward inside the catch tank and held in communication with either one of the oil introduction passages, and the second passage has a main portion larger in cross section than the orifice hole.

3. A heat-generating portion cooling structure as set forth in claim 2, in which the passage-forming member forms a conduit bent in the vicinity of the orifice hole such that the second passage has an upstream passage portion upstream of the orifice hole vertically extending above an upper side of the catch tank and a downstream passage portion downstream of the orifice hole horizontally extending to the other side of the catch tank.

4. A heat-generating portion cooling structure comprising:
a drawing unit configured to draw oil stored in a case into a catch tank provided in the case; and
an oil circulation passage formed in the case configured to circulate the oil in the case through the catch tank while the oil is being supplied to first and second heat-generating portions respectively positioned at one and the other sides of the catch tank, the oil circulation passage comprising
a first passage configured to allow the oil to flow down to the first heat-generating portion when a surface of the oil in the catch tank is raised to a first height,
a second passage configured to allow the oil to flow down to the second heat-generating portion when the surface of the oil in the catch tank is raised to a second height lower than the first height, and
a plurality of oil introduction passages configured to introduce the oil drawn by the drawing unit into the catch tank through a plurality of different paths, one side opening having the first passage opened to the catch tank, and the other side opening having the second passage opened to the catch tank,
wherein an amount of oil flowing down to the second heat-generating portion is greater than the amount of oil flowing down to the first heat-generating portion when the surface of the oil in the catch tank is raised to the second height while not being raised to the first height, and
wherein the catch tank is provided with a passage-forming member forming either one of the oil introduction passages, the passage-forming member is formed with one side orifice hole opened at the one side opening and the other side orifice hole opened at the other side opening, and the passage-forming member is constructed to partly close the one side opening and the other side opening to make the one side opening and the other side opening different in height from each other.

5. A heat-generating portion cooling structure as set forth in claim 4, in which the one side opening has a cross sectional area smaller than that of the other side opening.

6. A heat-generating portion cooling structure comprising:
a drawing unit configured to draw oil stored in a case into a catch tank provided in the case; and
an oil circulation passage formed in the case configured to circulate the oil in the case through the catch tank while the oil is being supplied to first and second heat-generating portions respectively positioned at one and the other sides of the catch tank, the oil circulation passage comprising a plurality of oil introduction passages configured to introduce the oil drawn by the drawing unit into the catch tank through a plurality of different paths, one side opening configured to allow the oil to flow down to the first heat-generating portion when a surface of the oil in the catch tank is raised to a first height, and the other side opening configured to allow the oil to flow down to the second heat-generating portion when the surface of the oil in the catch tank is raised to a second height, and
the catch tank having a partition wall portion inside configured to separate a first tank portion having the one side opening opened and a second tank portion having the other side opening opened, wherein
a ratio of the oil introduced into the first and second tank portions from the oil introduction passages is set such that the surface height of the oil in the first tank portion is always lower than the surface height of the oil in the second tank portion, excluding the time of the oil being full in the first and second tank portions, when the oil is drawn by the drawing unit.

7. A heat-generating portion cooling structure as set forth in claim 6, in which the drawing unit is operated to increase the drawing amount of oil to the catch tank in response to the increased output of the vehicle drive apparatus.

8. A heat-generating portion cooling structure as set forth in claim 7, in which the drawing unit comprises at least one rotation transmission element rotatably received in the case to draw the oil stored in the case to the catch tank, and a pump configured to pump the oil stored in the case to the catch tank.

9. A heat-generating portion cooling structure as set forth in claim 8, in which the rotation transmission element is operated to increase its rotation speed in response to the increased output of the vehicle drive apparatus to increase the drawing amount of oil to the catch tank.

10. A heat-generating portion cooling structure as set forth in claim 6, in which each of the heat-generating portions is constituted by an electric motor capable of generating an electric power.

* * * * *